US012739062B2

(12) United States Patent
You

(10) Patent No.: US 12,739,062 B2
(45) Date of Patent: Sep. 15, 2026

(54) METHOD, APPARATUS AND SYSTEM FOR SETTING HARQ FEEDBACK

(71) Applicant: GUANGDONG OPPO MOBILE TELECOMMUNICATIONS CORP., LTD., Dongguan (CN)

(72) Inventor: Xin You, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 617 days.

(21) Appl. No.: 17/650,641

(22) Filed: Feb. 10, 2022

(65) Prior Publication Data

US 2022/0200741 A1 Jun. 23, 2022

Related U.S. Application Data

(63) Continuation of application No. PCT/CN2019/100675, filed on Aug. 14, 2019.

(51) Int. Cl.

*H04L 1/1825* (2023.01)
*H04L 1/1812* (2023.01)
*H04L 1/1829* (2023.01)
*H04W 72/23* (2023.01)

(52) U.S. Cl.

CPC .......... *H04L 1/1825* (2013.01); *H04L 1/1812* (2013.01); *H04L 1/1854* (2013.01); *H04W 72/23* (2023.01)

(58) Field of Classification Search

None

See application file for complete search history.

(56) References Cited

U.S. PATENT DOCUMENTS

| | | | | |
|---|---|---|---|---|
| 8,756,470 | B2 | 6/2014 | Park | |
| 2017/0164363 | A1 | 6/2017 | Zhang et al. | |
| 2020/0313806 | A1* | 10/2020 | Wang | H04L 1/1822 |
| 2021/0029679 | A1* | 1/2021 | Si | H04L 1/1685 |
| 2021/0314092 | A1* | 10/2021 | Wen | H04L 1/1896 |
| 2022/0166558 | A1* | 5/2022 | Zhang | H04L 1/1812 |
| 2022/0239415 | A1* | 7/2022 | Narayanan Thangaraj | H04W 72/23 |

(Continued)

FOREIGN PATENT DOCUMENTS

| | | | |
|---|---|---|---|
| CN | 103957564 | A | 7/2014 |
| CN | 110098892 | A | 8/2019 |
| WO | 2019137939 | A1 | 7/2019 |

OTHER PUBLICATIONS

Thales "Study on solutions for NR to support non-terrestrial networks (NTN)" RP-190710; 3GPP TSG RAN Meeting #83; Shenzen, China; Mar. 18-21, 2019. 6 pages.

(Continued)

*Primary Examiner* — German Viana Di Prisco
(74) *Attorney, Agent, or Firm* — ASHURST PERKINS COIE US LLP

(57) ABSTRACT

The present application relates to the field of wireless communication, and disclosed thereby are a method, apparatus and system for transmitting data. The method comprises flexibly configuring HARQ feedback in a HARQ mechanism of a terminal according to RTT of a wireless signal. Since the HARQ feedback of the terminal may be selectively turned on or off, unnecessary burdens are prevented from being created for the terminal.

15 Claims, 17 Drawing Sheets setting a HARQ feedback to be in an enabled state or a disabled state according to a RTT of a wireless signal

201

(56) References Cited

U.S. PATENT DOCUMENTS

2022/0239417 A1* 7/2022 Cheng .................. H04L 1/1835
2023/0101780 A1* 3/2023 Ji ...................... H04W 72/1263
370/329

OTHER PUBLICATIONS

3GPP TSG RAN WG1 Meeting #92—R1-1802631—Atehns, Greece, Feb. 26-Mar. 2, 2018—InterDigital Inc., Considerations on HARQ Management for Non-Terrestrial Networks (3 pages).
3GPP TSG RAN WG1 Meeting #96bis—R1-1905733—Xi'an, China, Apr. 8-Apr. 12, 2019—MediaTek Inc., Summary Delay-tolerant re-transmission mechanisms in NR-NTN (7 pages).
International Search Report issued Jan. 23, 2020 of PCT/CN2019/100675 (4 pages).
Written Opinion mailed Jan. 23, 2020 of PCT/CN2019/100675 (7 pages).
CATT "HARQ consideration for NTN" R1-1906326; 3GPP TSG RAN WG1 Meeting #97; Reno, USA; May 13-17, 2019. 3 pages.
Extended European Search Report for European Application No. 19941421.0 issued Jun. 7, 2022. 12 pages.
MediaTek Inc. "Summary Delay-tolerant re-transmission mechanisms in NR-NTN" R1-1905840; 3GPP TSG RAN WG1 Meeting #96bis; Xi'an, China; Apr. 8-12, 2019. 7 pages.
Thales "NR-NTN: Chap 7.3—NR modifications to support the Non-Terrestrial Network deployment scenarios" R1-1807794; 3GPP TSG RAN1 Meeting #93; Busan, Korea; May 21-25; 2018. 43 pages.
Wang Chunting, Li Ning, Zhai Lijun, Lu Ningning, "A Preliminary Study on the Integration of Satellite Communications and Terrestrial 5G", Sep. 25, 2018, 16 pages with English translation.
First Office Action of the Chinese application No. 201980095020.2, issued on Jun. 27, 2023, 32 pages with English translation.
Second Office Action of the European application No. 19941421.0, issued on Aug. 21, 2023, 8 pages.
Chinese Patent 2nd Office Action dated Nov. 15, 2023 of Chinese Application No. 201980095020.2.
Chinese Patent Notice of Allowance dated Feb. 22, 2024 of Chinese Application No. 201980095020.2, 3 pages with English translation.
European Patent 3rd Office Action date Feb. 23, 2024 of European Application No. 19941421.0.
Examination Report for European Application No. 19941421.0 issued Feb. 24, 2023. 11 pages.
MediaTek Inc. "Implications of Supporting HARQ in NTN" Tdoc R2-1905703; 3GPP TSG-RAN WG2 Meeting #106; Reno, USA; May 13-17, 2019. 3 pages.
European Patent 4th Office Action date Aug. 20, 2024 of European Application No. 19941421.0, pp. 1-8.

* cited by examiner

METHOD, APPARATUS AND SYSTEM FOR SETTING HARQ FEEDBACK

CROSS REFERENCE TO RELATED APPLICATION

The present application is a Continuation application of PCT International Application No. PCT/CN2019/100675 filed on Aug. 14, 2019, the disclosure of which is incorporated herein by reference in its entirety for all purposes.

TECHNICAL FIELD

The present disclosure relate to the field of wireless communication, and more particularly, to a method, apparatus, and system for transmitting data.

BACKGROUND

Non-terrestrial network (NTN) technologies are technologies that use satellite communications to provide communications services to terrestrial users. Compared with terrestrial communications, there are many advantages. For example, the NTN technologies can be independent of user geographic restrictions so as to provide services for areas which are difficult for the terrestrial communications to cover. As another example, for the areas such as mountains, deserts, and oceans, the NTN technologies have lower communications costs than the terrestrial communications.

It is precisely because the NTN technologies have many unique advantages that the Third Generation Partnership Project (3GPP) has begun to carry out research work on integration of the satellite communications and the terrestrial communications. In the integration process of the satellite communications and the terrestrial communications, functions or protocols of the fifth-generation mobile communications technology (5G) new radio (NR) suitable for the terrestrial communications need to be adjusted appropriately so as to adapt to the NTN technologies. For example, the NTN technologies may cause a relatively long propagation delay. If a hybrid automatic repeat request (HARQ) mechanism suitable for the terrestrial communications is still used, burden on communication devices may be increased.

SUMMARY

Embodiments of the present disclosure provide a method, apparatus, and system for transmitting data, which can be used to solve problems such as increased burden on communication devices if a HARQ mechanism suitable for terrestrial communications is still used in NTN technologies. The technical solutions are as follows.

In an aspect, there is provided a method for transmitting data, applied to a terminal, and the method includes: setting a HARQ feedback of the terminal to be in an enabled state or a disabled state according to a round trip time (RTT) of a wireless signal, wherein the enabled state is a state in which an acknowledgement (ACK) or a negative acknowledgement (NACK) is fed back, and the disabled state is a state in which neither the ACK nor the NACK is fed back.

In another aspect, there is provided a method for transmitting data, applied to a network side device, and the method includes: setting a HARQ feedback of the network side device to be in an enabled state or a disabled state according to a RTT of a wireless signal, wherein the enabled state is a state in which an ACK or a NACK fed back by a terminal is received, and the disabled state is a state in which neither the ACK nor the NACK is fed back by the terminal.

In another aspect, there is provided an apparatus for transmitting data. The apparatus includes: a setting module. The setting module is configured to set a HARQ feedback of the apparatus to be in an enabled state or a disabled state according to a round trip time (RTT) of a wireless signal, wherein the enabled state is a state in which an ACK or a NACK is fed back, and the disabled state is a state in which neither the ACK nor the NACK is fed back.

In another aspect, there is provided an apparatus for transmitting data. The apparatus includes: a setting module. The setting module is configured to set a HARQ feedback of the apparatus to be in an enabled state or a disabled state according to a RTT of a wireless signal, wherein the enabled state is a state in which an ACK or a NACK fed back by a terminal is received, and the disabled state is a state in which neither the ACK nor the NACK is fed back by the terminal.

In another aspect, there is provided a system for transmitting data, including a terminal and a network side device, wherein the terminal includes the above-mentioned apparatus for transmitting data applied to the terminal, and the network side device includes the above-mentioned apparatus for transmitting data applied to the network side device.

In another aspect, there is provided a terminal, including a processor and a memory, wherein the memory stores at least one instruction, and the at least one instruction is configured to be executed by the processor to implement the above-mentioned method for transmitting data applied to the terminal.

In another aspect, there is provided a network side device, including a processor and a memory, wherein the memory stores at least one instruction, and the at least one instruction is configured to be executed by the processor to implement the above-mentioned method for transmitting data applied to the network side device.

In another aspect, there is provided a computer-readable storage medium storing at least one instruction, wherein the at least one instruction is configured to be executed by a processor to implement the above-mentioned method for transmitting data applied to the terminal, or to implement the above-mentioned method for transmitting data applied to the network side device.

In another aspect, there is provided a chip, including a programmable logic circuit and/or program instructions, wherein the chip, when running, is configured to implement the above-mentioned method for transmitting data applied to the terminal, or to implement the above-mentioned method for transmitting data applied to the network side device.

In another aspect, there is provided a computer program product, including one or more computer programs which, when executed by a processor, is configured to implement the above-mentioned method for transmitting data applied to the terminal, or to implement the above-mentioned method for transmitting data applied to the network side device.

The beneficial effects brought by the technical solutions provided by embodiments of the present disclosure are at least as follows.

The HARQ feedback in the HARQ mechanism of the terminal is flexibly set according to the RTT of the wireless signal. Since the HARQ feedback of the terminal can be selectively turned on or off, unnecessary burdens on the terminal are avoided. Moreover, when the HARQ feedback of the terminal is in an off state (that is, the disabled state), a transmission delay of the wireless signal can be reduced.

BRIEF DESCRIPTION OF THE DRAWINGS

In order to explain technical solutions in embodiments of the present disclosure more clearly, the following will briefly introduce drawings needed in the description of these embodiments. Obviously, the drawings in the following description are only some embodiments of the present disclosure. For those of ordinary skill in the art, other drawings can be obtained from these drawings without creative labor

DETAILED DESCRIPTION

Figure 1:
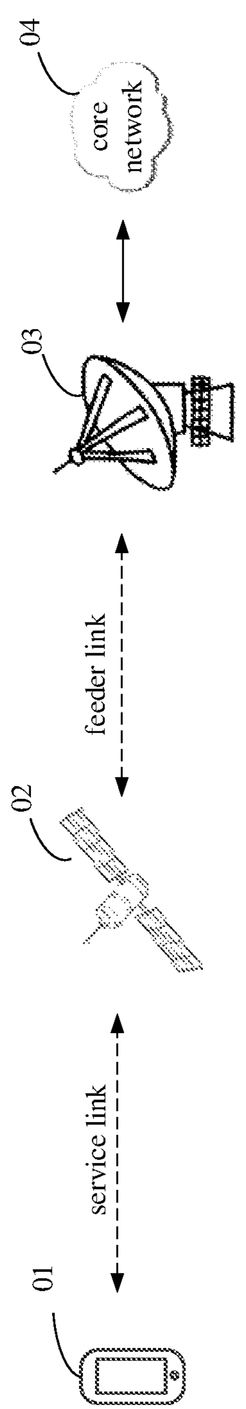
FIG. 1 is a schematic diagram of an implementation environment provided by an embodiment of the present disclosure.

In order to make objectives, technical solutions, and advantages of the present disclosure clearer, the following will further describe embodiments of the present disclosure in detail with reference to the drawings.

At present, 3GPP is studying NTN technologies, which generally use satellite communications to provide communication services to terrestrial users. Compared with the terrestrial communications (such as terrestrial cellular networks), the satellite communications have many unique advantages. First of all, the satellite communications are independent of user geographic restrictions. For example, the typical terrestrial communications cannot cover areas where communication devices cannot be set up such as oceans, mountains, and deserts, or areas that are not provided with the communications due to sparse population. However, for the satellite communications, one satellite can cover a large terrestrial area, and the satellite can orbit the earth. Thus, every corner of the earth can be covered by the satellite communications from a theoretical perspective. Secondly, the satellite communications have greater social value. Remote mountainous areas, poor and backward countries or regions can be covered by the satellite communications at a lower cost, so that people in these areas can enjoy advanced voice communications and mobile Internet technologies. Thereby, it facilitates to narrow the digital divide between these areas and developed areas, and promote the development of these areas. Thirdly, the satellite communications have a long communication distance, and the communication cost does not increase significantly as the communication distance increases. Finally, the satellite communications have a high stability, and are not restricted by natural disasters.

Depending on orbital altitudes of communication satellites, the communication satellites can be classified into: low-earth orbit (LEO) satellites, medium-earth orbit (MEO) satellites, geostationary earth orbit (GEO) satellites, and high elliptical orbit (HEO) satellites, etc. At the present stage, 3GPP mainly studies the LEO satellites and the GEO satellites. The orbital altitude of LEO satellites is in a range from 500 kilometers (km) to 1500 km, and the corresponding orbital period is about 1.5 hours to 2 hours. A signal propagation delay of single-hop communication between users is generally less than 20 milliseconds (ms), and the maximum satellite visible time is 20 minutes. The NTN technologies based on LEO satellites are characterized by short signal propagation distance, low link loss, and low requirements for transmission power of the user terminal. The GEO satellites have an orbital altitude of 35786 km, a rotation period around the earth of 24 hours, and a signal propagation delay of single-hop communication between users which is generally 250 ms. In order to ensure the coverage area of the satellite on the earth and increase a system capacity of the entire satellite communication system, the satellite uses multiple beams to cover the ground. That is, one satellite can form dozens or even hundreds of satellite beams to cover the ground, and each of the satellite beams can cover a ground area with a diameter of tens to hundreds of kilometers.

In an integration process of the satellite communications and the terrestrial communications, functions or protocols of the NR suitable for the terrestrial communications need to be adjusted appropriately so as to adapt to the NTN technologies. For example, a HARQ mechanism in the NR protocol suitable for the terrestrial communications needs to be adjusted, so as to adapt to the integration of the satellite communications and the terrestrial communications.

In order to help understand the relevant description of embodiments of the present disclosure, the following is a brief introduction to the HARQ mechanism in the NR protocol.

The NR protocol defines two levels of retransmission mechanisms, namely a HARQ mechanism of a medium access control (MAC) layer, and an automatic repeat request (ARQ) mechanism of a radio link control (RLC) layer. The retransmission of lost or erroneous data is mainly handled by the HARQ mechanism of the MAC layer, and then supplemented by the retransmission function of the RLC layer. The HARQ mechanism of the MAC layer can provide fast data retransmission, and the ARQ mechanism of the RLC layer can provide reliable data transmission.

The HARQ mechanism uses the stop-and-wait protocol (also known as the SQW protocol) to send data. In the stop-and-wait protocol, after sending a transmission block (TB), a sender stops and waits for an acknowledgment. This process can also be called a HARQ feedback. In this way, the sender will stop and wait for confirmation after sending each TB, resulting in very low user throughput. Therefore, in order to improve the user throughput, the NR uses multiple parallel HARQ processes to send data blocks. When one HARQ process is waiting for the confirmation information, the sender can use another HARQ process to continue sending the data blocks. These HARQ processes together form one HARQ entity, which HARQ entity combines the stop-and-wait protocol to allow continuously sending the data blocks. The multiple HARQ processes include uplink HARQ processes and downlink HARQ processes. The uplink HARQ processes and the downlink HARQ processes are independent of each other and do not affect each other. The number of uplink HARQ processes can be same as that of downlink HARQ processes. The uplink HARQ processes are aimed at uplink data transmission, and the downlink HARQ processes are aimed at downlink data transmission. The confirmation message includes an ACK and a NACK. If it is confirmed that the reception is successful, the confirmation message is the ACK. If it is confirmed that the reception fails, the confirmation message is the NACK. For ease of description, the TBs sent by the sender are all referred to as data or wireless signals in the following.

When each downlink HARQ process is used for downlink data transmission, a network side device (such as a base station) needs to allocate an appropriate time-frequency domain resource for the downlink transmission of the terminal before transmitting the downlink data to the terminal, and informs the terminal through a physical downlink control channel (PDCCH) carrying downlink control information (DCI, also known as downlink scheduling signaling). The DCI includes a position of the allocated time-frequency domain resource, MCS, an ID of the used downlink HARQ process, and initial transmission or retransmission indication, etc. The network side device uses a first downlink HARQ process to send the downlink data to the terminal. The terminal uses a second downlink HARQ process indicated by the ID on the corresponding resource to receive the downlink data according to the received DCI indication, and decodes the data. If the terminal decodes successfully, it may feed the ACK back to the network side device. After receiving the ACK, the network side device can continue to use the first downlink HARQ process to continue sending new data. If the terminal fails to decode, it may feed the NACK back to the network side device. After receiving the NACK, the network side device determines whether to continue using the first downlink HARQ to retransmit the data or to discard the data and transmit new data (that is, the initial transmission). Before receiving the ACK or NACK feedback for a certain downlink HARQ process from the terminal, the network side device cannot use the first downlink HARQ process for data transmission. Accordingly, before the network side device performs the initial transmission or retransmission of data, the terminal cannot use the second downlink HARQ process to receive data. Before using a certain downlink HARQ process to complete the downlink transmission, the terminal may not receive another DCI to instruct the terminal to use the same downlink HARQ process for downlink transmission.

When each uplink HARQ process is used for uplink transmission of data, before actually transmitting uplink data, the terminal (such as user equipment) needs to be allocated an appropriate time-frequency domain resource by the network side device for the uplink transmission of the terminal, and the terminal is informed through the PDCCH carrying the DCI. The DCI includes the position of the allocated time-frequency domain resource, the MCS, the ID of the used uplink HARQ process, and the initial transmission or retransmission indication, etc. Based on the received DCI indication, the terminal uses a third uplink HARQ process indicated by the ID on the corresponding resource to send the uplink data. The network side device receives the uplink data based on a fourth uplink HARQ process, and then decodes the uplink data. If the network side device decodes successfully, the network side device can schedule the terminal to continue using the third uplink HARQ process to transmit new data. If the network side device fails to decode, the network side device determines whether the terminal continues to use the third uplink HARQ process to retransmit the data or discard the data and transmit new data. Before receiving the uplink data transmitted from the terminal, the network side device cannot schedule the terminal to use the third uplink HARQ process for data transmission. Accordingly, before the network side device receives the data of the fourth uplink HARQ process, the terminal cannot use the third uplink HARQ process to send data. Before using a certain uplink HARQ process to complete the uplink transmission, the terminal may not send another DCI to instruct the terminal to use the same uplink HARQ process for uplink transmission.

It should be noted that the network side device is provided with at least two HARQ processes, wherein the at least two HARQ processes include a downlink HARQ process and an uplink HARQ process. The terminal is also provided with at least two HARQ processes, wherein the at least two HARQ processes also include a downlink HARQ process and an uplink HARQ process. In the description above, the first downlink HARQ process and the fourth uplink HARQ process are both HARQ processes in the network side device, while the second downlink HARQ process and the third uplink HARQ process are both HARQ processes in the terminal.

It is stipulated in the NR protocol applicable to the terrestrial communications that each serving cell corresponding to the terminal has its own HARQ entity. Each HARQ entity is responsible for maintaining a set of parallel downlink HARQ processes and a set of parallel uplink HARQ processes. At present, each uplink carrier and each downlink carrier both support up to 16 HARQ processes. The base station can indicate the maximum number of HARQ processes to the terminal through the semi-static configuration of radio resource control (RRC) signaling according to a network deployment condition. If the network does not provide the corresponding configuration parameter, the default maximum number of HARQ processes supported by each downlink carrier is 8, and the maximum number of HARQ processes supported by each uplink carrier is always 16. Each HARQ process corresponds to one HARQ process number (identity or identification, ID). For the downlink transmission, a broadcast control channel (BCCH) uses a dedicated broadcast HARQ process. For the uplink transmission, the third message (Msg3) transmitted in a random procedure uses HARQ ID 0.

For a terminal that does not support downlink spatial division multiplexing, each downlink HARQ process can only process one TB at a time. For a terminal that supports downlink spatial division multiplexing, each downlink HARQ process can process one TB or two TBs at a time. Each uplink HARQ process of the terminal processes one TB at a time. The HARQ mechanism can be classified into a synchronous HARQ mechanism and an asynchronous HARQ mechanism in time domain, and a non-adaptive HARQ mechanism and an adaptive HARQ mechanism in frequency domain. The uplink and downlink transmissions in the NR protocol use an asynchronous adaptive HARQ mechanism. The asynchronous HARQ mechanism means that the retransmission of TB can be performed at any time. For the same TB, a time interval between its retransmission and the previous transmission is not fixed. The adaptive HARQ mechanism means that a frequency domain resource and modulation and coding scheme (MCS) used for the retransmission of TB can be changed.

Based on the above introduction, it can be seen that for the HARQ mechanism in the NR protocol suitable for the terrestrial communications, during the downlink transmission, the network side device needs to wait for the ACK or NACK with regard to the previous downlink HARQ process fed back by a receiving terminal, before it can continue to schedule this downlink HARQ process for downlink transmission; and during the uplink transmission, the network side device needs to wait until the decoding of the received uplink data transmitted based on a uplink HARQ process is completed, so as to continue scheduling the same uplink HARQ process for uplink transmission. This makes the propagation delay of data to be longer, especially for a case where a distance between the satellite and the ground is farther, thus causing the propagation delay of the NTN technologies to be more serious.

In addition, in a case where the HARQ mechanism in the NR protocol suitable for the terrestrial communications is still used, although the multiple parallel HARQ processes can be used to send data, the longer the propagation delay, the more the HARQ processes that need to be set up and maintained in the communication devices (including the terminal and the network side device). In this case, in order to achieve continuous data transmission under a severe delay, the communication devices need to support a larger number of HARQ processes (of course, even if the maximum number of HARQ processes is supported, it may be difficult to alleviate the propagation delay). This not only requires further function expansion of the communication devices based on the existing functions, but also poses higher requirements on the communication devices, which increases the burden on the communication devices.

It should be noted that if the communication device turns on the HARQ feedback, that is, the HARQ feedback is in an available state, it can be said that the HARQ feedback of the communication device is in an enabled state (or activated state), and the communication device can feed the confirmation message back in this state. Accordingly, if the communication device turns off the HARQ feedback, that is, the HARQ feedback is in an unavailable state, it can be said that the HARQ feedback of the communication device is in a disabled state (or deactivated state), and the communication device cannot feed the confirmation messages back in this state. The communication device is a device capable of performing communication, such as a terminal, a base station, or a satellite.

FIG. 1 shows a schematic diagram of an implementation environment provided by an embodiment of the present disclosure. The implementation environment describes a satellite access network in the NTN technologies. The implementation environment includes a terminal 01, a satellite 02, a gateway 03, and a core network 04.

In the NTN technologies, there may be multiple terminals 01, and the multiple terminals 01 may all be in communication connection with the satellite 02. FIG. 1 only schematically shows a situation with one terminal 01. In addition, there may be multiple satellites 02, and the multiple satellites 02 are connected through inter satellite/aerial links (ISL). FIG. 1 only schematically shows a situation with one satellite 02.

In the NTN technologies, the terminal can also be called an NTN terminal, which NTN terminal can be a terminal defined by 3GPP. Alternatively, when the satellite does not directly serve the terminal defined by 3GPP, the NTN terminal can be a terminal specific to a satellite system. The terminal may be user equipment (UE).

The terminal 01 is communicatively connected to the satellite 02 via a service link, which service link refers to a radio link between the terminal 01 and the satellite 02. In addition, the terminal 01 can also support a wireless communication connection with a terrestrial access network.

The satellite 02 can also be called space or airborne platform (space/airborne platform), which can realize bent pipe or regenerative payload configuration.

The gateway 03 is used to connect the satellite (or aviation access network) 02 and the core network. The gateway 03 and the satellite 02 are connected by a feeder link.

In the implementation environment provided by an embodiment of the present disclosure, the satellite 02 is used to connect the terminal 01 to the core network 04. Note that, other optional implementation environments may also include the base station, which is not limited by embodiments of the present disclosure.

Figure 2:
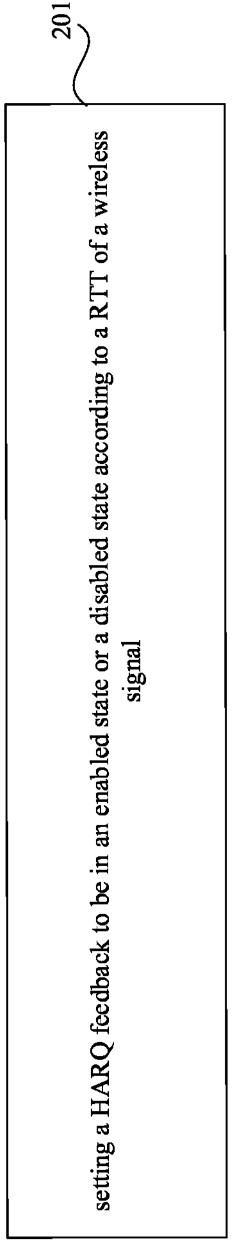
FIG. 2 is a flowchart of a method for transmitting data provided by an embodiment of the present disclosure.

FIG. 2 shows a flowchart of a method for transmitting data provided by an embodiment of the present disclosure. The method can be applied to the terminal 01 in the implementation environment shown in FIG. 1. The method includes the following steps.

In step 201, a HARQ feedback is set to be in an enabled state or a disabled state according to a RTT of a wireless signal.

The enabled state is a state in which an ACK or a NACK is fed back, and the disabled state is a state in which neither the ACK nor the NACK is fed back. The wireless signal is a wireless signal sent based on a HARQ process.

In summary, in the method for transmitting data provided in an embodiment of the present disclosure, the HARQ feedback function in the HARQ mechanism of the terminal can be flexibly set according to the RTT of the wireless signal. Since the HARQ feedback of the terminal can be selectively turned on or off, unnecessary burdens on the terminal are avoided. Moreover, when the HARQ feedback of the terminal is in an off state (that is, a disabled state), a transmission delay of the wireless signal can be reduced.

For the NTN technologies, the RTT can be twice a sum of a backhauling delay $T_{p1}$ between the satellite and the gateway and a forward/reverse satellite link delay $T_{p2}$ between the terminal and the satellite, namely $RTT=2(T_{p1}+T_{p2})$. Please note that based on different perspectives, the RTT may also have other textual expressions and formula expressions, and embodiments of the present disclosure are only illustrative descriptions and are not limited in this regard.

It should be noted that in an embodiment of the present disclosure, as an example, the terminal feeds back the ACK or NACK, and the network side device (such as the base station or the satellite) directly schedules the terminal to perform data retransmission or initial transmission without feeding back the ACK or NACK. Please note that, in other optional embodiments, both the network side device and the terminal can feed back the ACK or NACK, and then reference may be also made to the method for transmitting data provided by an embodiment of the present disclosure to control the HARQ feedback of the network side device. Embodiments of the present disclosure are not limited in this regard.

In an embodiment of the present disclosure, two methods for determining the RTT of the wireless signal are provided. That is, the RTT is determined by the network side device, and the RTT is determined by the terminal, respectively. The following respectively describes the method for transmitting data provided by embodiments of the present disclosure based on these two methods for determining RTT and the interaction between the network side device and the terminal.

In a first method for determining RTT, the network side device measures the RTT required for transmitting the wireless signal between the network side device and the terminal, and the terminal sets the HARQ feedback of the terminal according to the RTT.

Each terminal can support multiple HARQ processes, each HARQ process having a HARQ feedback function. In addition, the terminal can support multiple service types, and each service type can use multiple HARQ processes, each HARQ process having the HARQ feedback function. Moreover, when the network side device is a satellite, a communication range of the satellite on the ground covers a cell. There are multiple corresponding terminals in the cell, and each terminal can support multiple HARQ processes, each HARQ process having the HARQ feedback function. The HARQ process may be the uplink HARQ process or the downlink HARQ process. For multiple corresponding relationships between the terminal, the service type, the cell, and the HARQ process, four methods for transmitting data are provided below.

It should be noted in advance that first signaling, second signaling, third signaling, fourth signaling, fifth signaling, and sixth signaling mentioned in the first three methods for transmitting data below can all be higher layer signaling or physical layer signaling. The higher layer signaling refers to configuration information from a layer above the physical layer, and the higher layer signaling may be RRC signaling or a media access control (MAC) control element (CE). The physical layer signaling refers to configuration information from the physical layer, such as the DCI carried by the PDCCH.

In a first method for transmitting data, the HARQ feedback of the terminal is set to be in the enabled state or the disabled state according to the RTT of the wireless signal. In this method, the state of HARQ feedback is set in units of terminal. The setting the HARQ feedback of the terminal to be in the enabled state or the disabled state refers to setting a HARQ feedback of each HARQ process among all the HARQ processes supported by the terminal to be in the enabled state or the disabled state.

Figure 3:
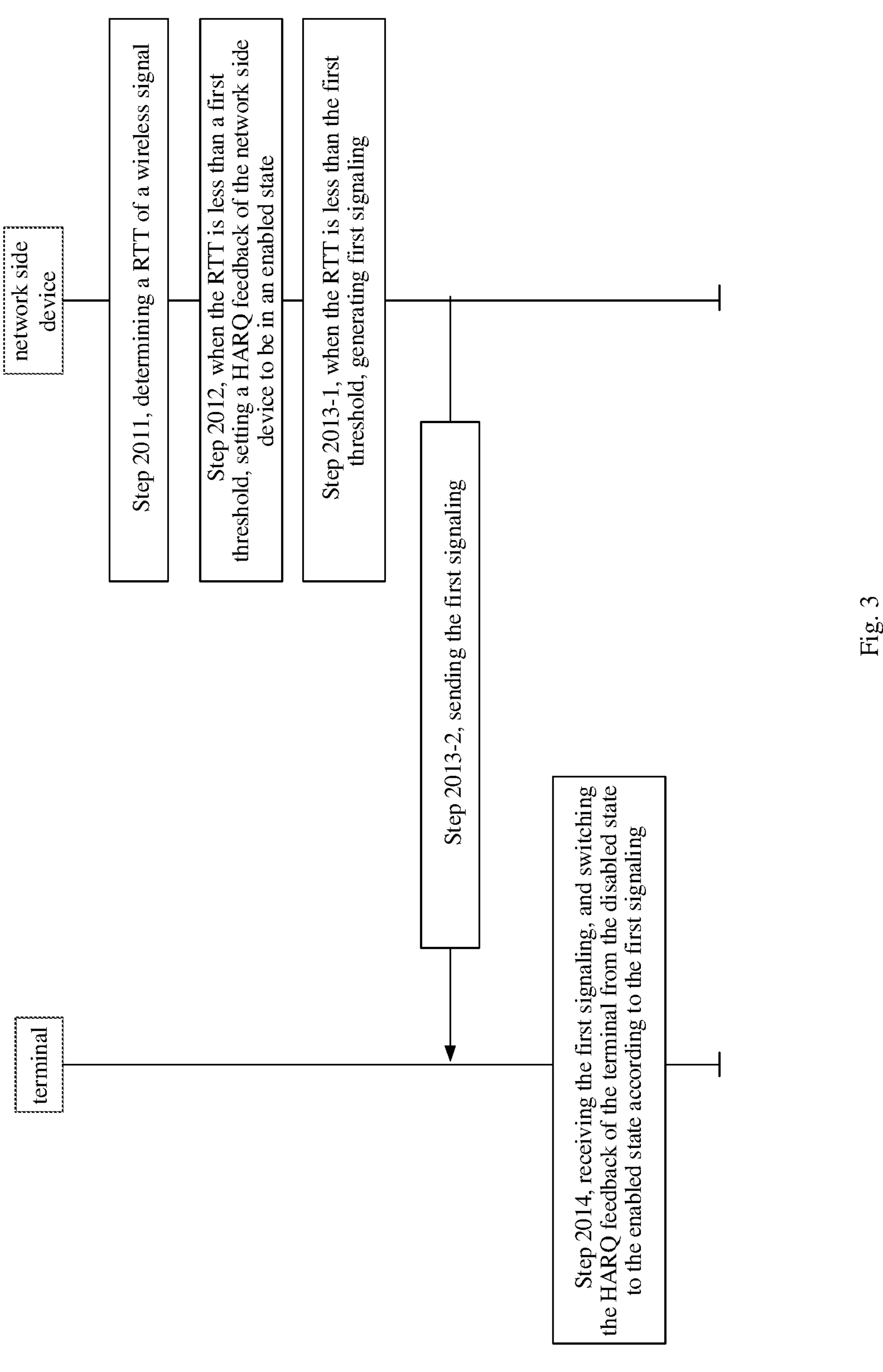
FIG. 3 is a flowchart of a method for setting a HARQ feedback of a terminal to be in an enabled state provided by an embodiment of the present disclosure.

As shown in FIG. 3, a method for setting a HARQ feedback of a terminal to be in an enabled state may include the following steps.

In step 2011, the network side device determines the RTT of the wireless signal.

The network side device may use a time when it sends data to the terminal as a start time, and use a time when the ACK or NACK for the data is received from the terminal as an end time. The network side device determines the elapsed time between the start time and the end time as the RTT.

In step 2012, when the RTT is less than a first threshold, the network side device sets a HARQ feedback of the network side device to be in the enabled state.

The enabled state is a state in which the acknowledgement (ACK) or the negative acknowledgement (NACK) fed back by the terminal is received.

In step 2013-1, when the RTT is less than the first threshold, the network side device generates first signaling.

The first threshold is used to switch the HARQ feedback of the terminal to be in the enabled state, and the first threshold may be stored in the network side device in advance. In this way, it can be ensured that both the terminal and the network side device are in the enabled state.

In step 2013-2, the network side device sends the first signaling.

In order to avoid repeated operations on the state of the HARQ feedback of the terminal, the network side device may determine that the current HARQ feedback of the terminal is in the disabled state after generating the first signaling, and then send the first signaling to the terminal.

In step 2014, the terminal receives the first signaling, and switches the HARQ feedback of the terminal from the disabled state to the enabled state according to the first signaling.

The first signaling is used to instruct to switch the HARQ feedback of the terminal from the disabled state to the enabled state.

Figure 4:
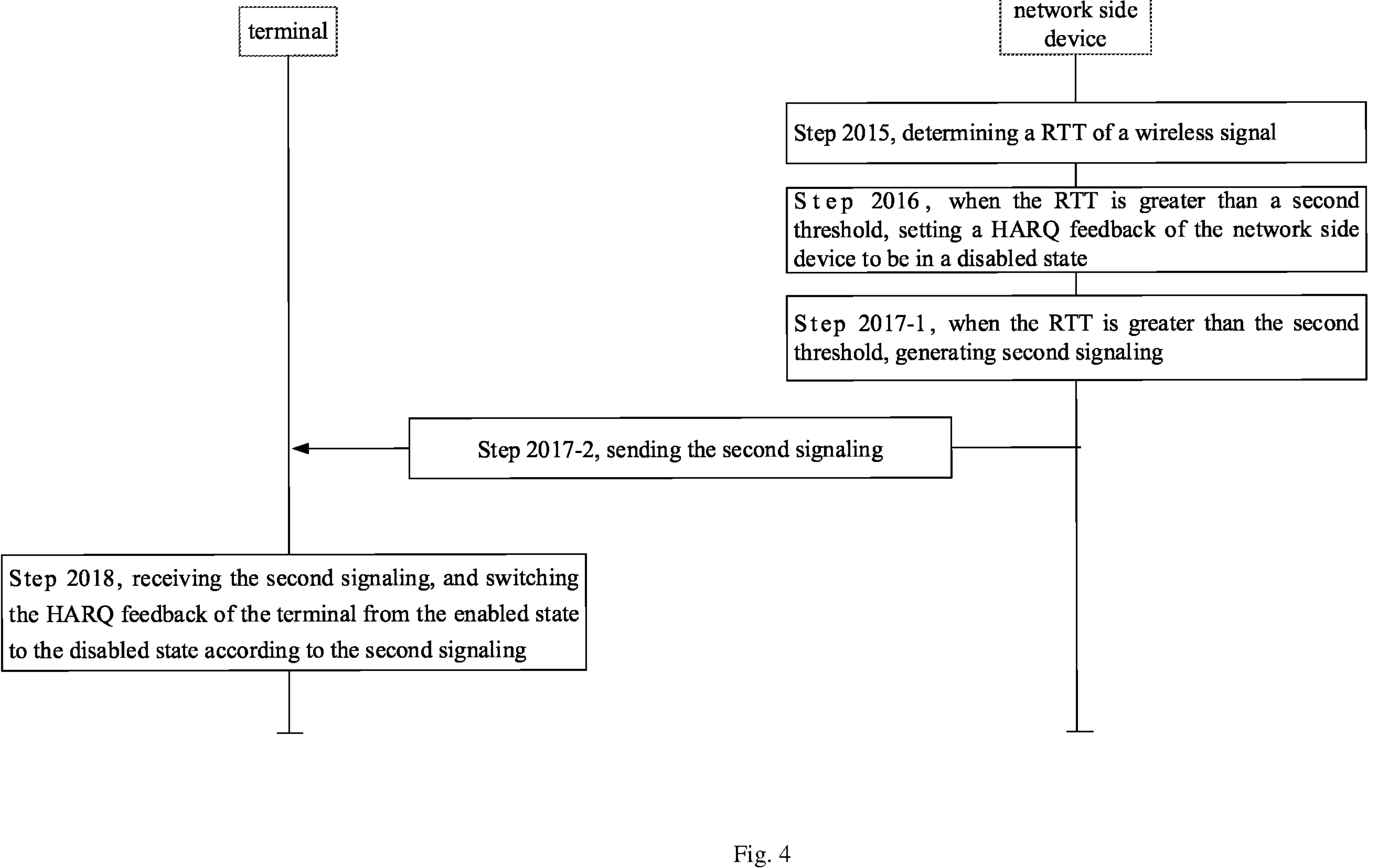
FIG. 4 is a flowchart of a method for setting a HARQ feedback of a terminal to be in a disabled state provided by another embodiment of the present disclosure.

In addition, as shown in FIG. 4, a method for setting a HARQ feedback of a terminal to be in a disabled state may include the following steps.

In step 2015, the network side device determines the RTT of the wireless signal.

For the relevant description about determining the RTT of the wireless signal by the network side device in the step 2015, reference may be made to the above step 2011, which is not repeated by embodiments of the present disclosure.

In step 2016, when the RTT is greater than a second threshold, the network side device sets the HARQ feedback of the network side device to be in the disabled state.

The disabled state is a state in which neither ACK nor NACK is fed back by the terminal.

In step 2017-1, when the RTT is greater than the second threshold, the network side device generates second signaling.

The second threshold is used to switch the HARQ feedback of the terminal to the disabled state, and the second threshold may be stored in the network side device in advance.

In step 2017-2, the network side device sends the second signaling.

In order to avoid repeated operations on the state of the HARQ feedback of the terminal, the network side device may determine that the current HARQ feedback of the terminal is in the enabled state after generating the second signaling, and then send the second signaling to the terminal.

In step 2018, the terminal receives the second signaling, and switches the HARQ feedback of the terminal from the enabled state to the disabled state according to the second signaling.

The second signaling is used to instruct to switch the HARQ feedback of the terminal from the enabled state to the disabled state.

It should be noted that the second threshold is greater than or equal to the first threshold.

Optionally, before receiving the first signaling or the second signaling, the terminal receives other signaling used to indicate an initial state of the HARQ feedback of the terminal. After receiving the other signaling, the terminal can set the HARQ feedback of the terminal according to the other signaling. For example, if the other signaling instructs to set the initial state of the HARQ feedback of the terminal to be the enabled state, the terminal sets the initial state of its HARQ feedback to be the enabled state after receiving the other signaling. The other signaling may be the higher layer signaling or the physical layer signaling.

In other optional implementations, the initial state of the HARQ feedback of the terminal is set in a predefined manner. For example, the initial state of the HARQ feedback of the terminal is set to be the enabled state or the disabled state by setting a default state.

In a second method for transmitting data, HARQ feedbacks of all or part of HARQ processes among at least one HARQ process supported by the terminal are set to be in the enabled state or the disabled state according to the RTT of the wireless signal.

As mentioned above, the terminal can support multiple HARQ entities, and each HARQ entity can correspond to multiple HARQ processes. The terminal may set the HARQ feedbacks of all or part of the HARQ processes among the at least one HARQ process supported by the terminal to be in the enabled state or the disabled state according to the RTT of the wireless signal. The at least one HARQ process includes one HARQ process or multiple HARQ processes. In this method, the state of the HARQ feedback is set in units of HARQ process. That is, the state of the HARQ feedback is separately set for each HARQ process.

Figure 5:
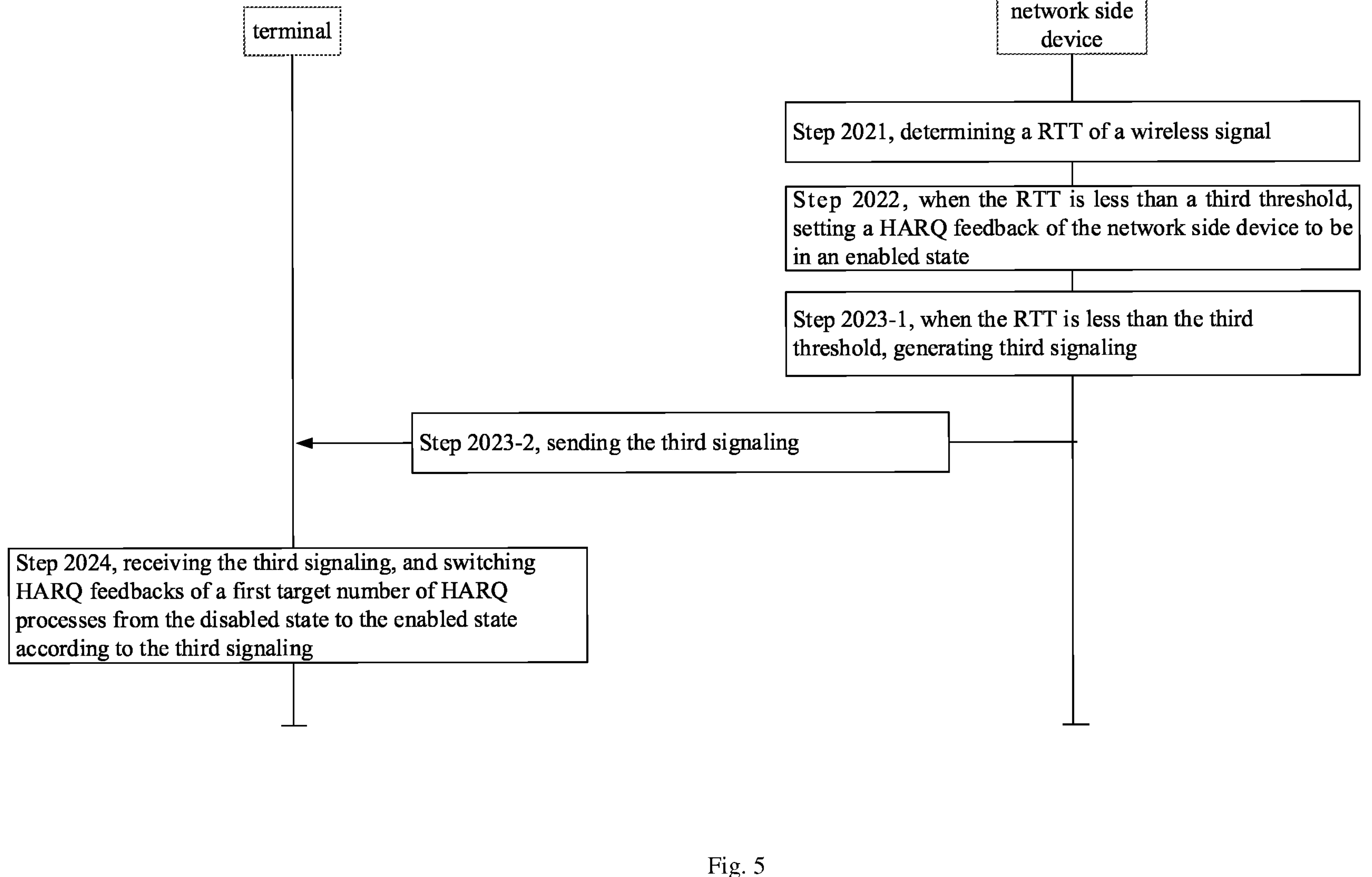
FIG. 5 is a flowchart of a method for setting a HARQ feedback of a terminal to be in an enabled state provided by an embodiment of the present disclosure.

As shown in FIG. 5, a method for setting a HARQ feedback of a terminal to be in an enabled state may include the following steps.

In step 2021, the network side device determines the RTT of the wireless signal.

For the relevant description about determining the RTT of the wireless signal by the network side device in the step 2021, reference may be made to the above step 2011, which is not repeated by embodiments of the present disclosure.

In step 2022, when the RTT is less than a third threshold, the network side device sets the HARQ feedback of the network side device to be in the enabled state.

The enabled state is a state in which the acknowledgement (ACK) or the negative acknowledgement (NACK) fed back by the terminal is received.

In step 2023-1, when the RTT is less than the third threshold, the network side device generates third signaling.

The third threshold is used to switch the HARQ feedback of the terminal to the enabled state, and the third threshold may be stored in the network side device in advance.

In step 2023-1, the network side device sends the third signaling.

In step 2024, the terminal receives the third signaling, and switches the HARQ feedbacks of the first target number of HARQ processes from the disabled state to the enabled state according to the third signaling.

The third signaling is used to instruct to switch the HARQ feedbacks of the first target number of HARQ processes from the disabled state to the enabled state.

The third signaling may indicate a process ID of each HARQ process of the first target number of HARQ processes. The terminal switches a HARQ process corresponding to the process ID from the disabled state to the enabled state according to the process ID.

In order to avoid repeated operations on the state of the HARQ feedback of the HARQ process in the terminal, the network side device may determine that the HARQ feedbacks of the HARQ processes corresponding to the process IDs indicated by the third signaling are all in the disabled state after generating the third signaling, and then send the third signaling to the terminal.

The first target number can be freely set by the network side device.

Figure 6:
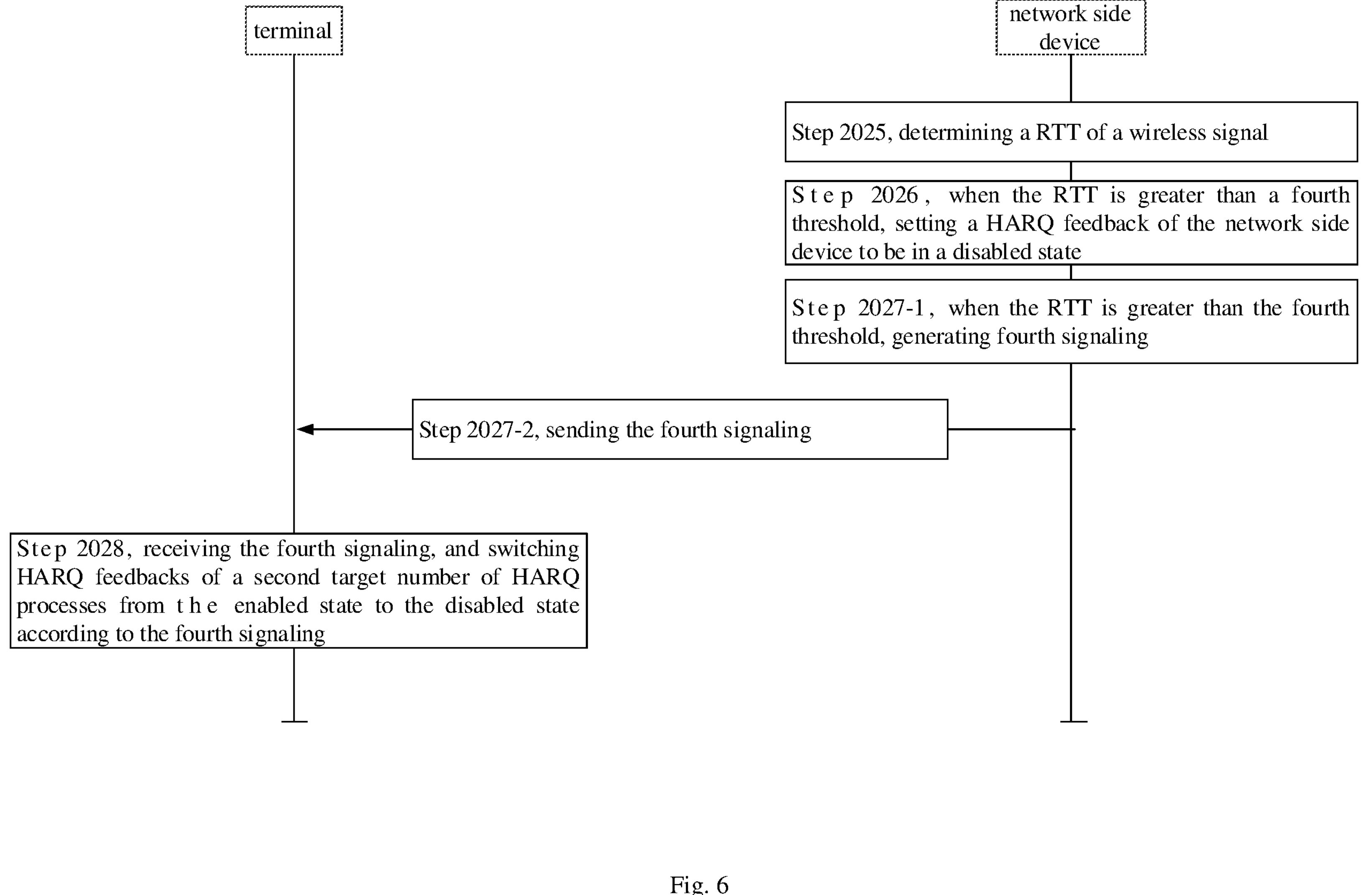
FIG. 6 is a flowchart of a method for setting a HARQ feedback of a terminal to be in a disabled state provided by another embodiment of the present disclosure.

In addition, as shown in FIG. 6, a method for setting a HARQ feedback of a terminal to be in a disabled state may include the following steps.

In step 2025, the network side device determines the RTT of the wireless signal.

For the relevant description about determining the RTT of the wireless signal by the network side device in the step 2025, reference may be made to the above step 2011, which is not repeated by embodiments of the present disclosure.

In step 2026, when the RTT is greater than a fourth threshold, the network side device sets the HARQ feedback of the network side device to be in the disabled state.

The disabled state is a state in which neither the ACK nor the NACK is fed back by the terminal.

In step 2027-1, when the RTT is greater than the fourth threshold, the network side device generates fourth signaling.

The fourth threshold is used to switch the HARQ feedback of the terminal to the disabled state, and the fourth threshold may be stored in the network side device in advance.

In step 2027-1, the network side device sends the fourth signaling.

In step 2028, the terminal receives the fourth signaling, and switches the HARQ feedbacks of the second target number of HARQ processes from the enabled state to the disabled state according to the fourth signaling.

The fourth signaling is used to instruct to switch the HARQ feedbacks of the second target number of HARQ processes from the enabled state to the disabled state.

The fourth signaling may indicate a process ID of each HARQ process among the second target number of HARQ processes, and the terminal switches a HARQ process corresponding to the process ID from the enabled state to the disabled state according to the process ID.

In order to avoid repeated operations on the state of the HARQ feedback of the HARQ process in the terminal, the network side device may determine that the HARQ feedbacks of the HARQ processes corresponding to the process IDs indicated by the third signaling are all in the enabled state after generating the fourth signaling, and then send the fourth signaling to the terminal.

The second target number can be freely set by the network side device. The first target number and the second target number may be the same or different.

It should be noted that the fourth threshold is greater than or equal to the third threshold.

Optionally, as similar to the above-mentioned first method for transmitting data, before receiving the third signaling or the fourth signaling, the terminal further receives other signaling used to indicate an initial state of the HARQ feedback of each HARQ process among the at least one HARQ process supported by the terminal. After receiving the other signaling, the terminal may set the HARQ feedback of each HARQ process among the at least one HARQ process according to the other signaling. The other signaling may also indicate the number of HARQ processes supported by the terminal, including the number of downlink HARQ processes supported by the terminal and the number of uplink HARQ processes supported by the terminal. The other signaling may be the higher layer signaling or the physical layer signaling.

In other optional implementations, the initial state of the HARQ feedback of each HARQ process is set in a predefined manner. For example, the initial state of the HARQ feedback of each HARQ process is set to be the enabled state or the disabled state by setting a default state.

In a third method for transmitting data, HARQ feedbacks of all or part of service types among at least one service type received by the terminal are all set to be in the enabled state or the disabled state according to the RTT of the wireless signal.

As described above, the terminal can support at least one service type, and each service type can use multiple HARQ processes, each HARQ process having an HARQ feedback function. The at least one service type includes one service type or multiple service types. In the third method for transmitting data, the setting the HARQ feedbacks of all or part of service types to be in the enabled state or the disabled state refers to setting the state of the HARQ feedback in units of service type. The setting the HARQ feedback of the service type to be in the enabled state or the disabled state refers to setting the HARQ feedback of each HARQ process among all the HARQ processes used by each service type to be in the enabled state or the disabled state. It should be noted that the multiple HARQ processes used by the service type are not fixed. That is, during multiple wireless signal transmission processes for the same service type, identical individuals of the multiple HARQ processes can be used or different individuals of the multiple HARQ processes can also be used.

Figure 7:
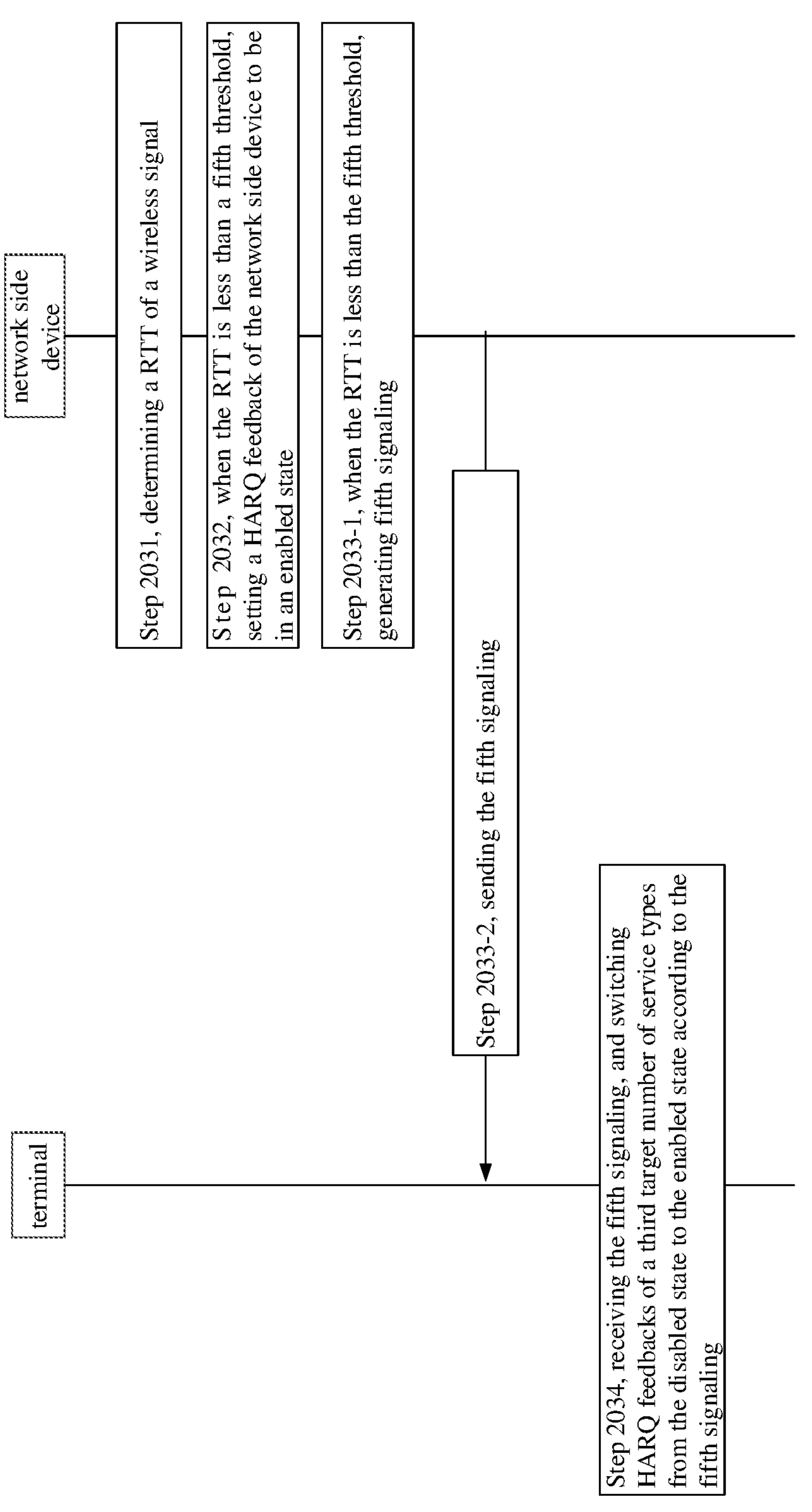
FIG. 7 is a flowchart of a method for setting a HARQ feedback of a terminal to be in an enabled state provided by an embodiment of the present disclosure.

As shown in FIG. 7, a method for setting a HARQ feedback of a terminal to be in an enabled state may include the following steps.

In step 2031, the network side device determines the RTT of the wireless signal.

For the relevant description about determining the RTT of the wireless signal by the network side device in the step 2031, reference may be made to the above step 2011, which is not repeated by embodiments of the present disclosure.

In step 2032, when the RTT is less than a fifth threshold, the network side device sets the HARQ feedback of the network side device to be in the enabled state.

The enabled state is a state in which the acknowledgement (ACK) or the negative acknowledgement (NACK) fed back by the terminal is received.

In step 2033-1, when the RTT is less than the fifth threshold, the network side device generates fifth signaling.

The fifth threshold is used to switch the HARQ feedback of each service type among all or part of service types to the enabled state. The fifth threshold may be stored in the network side device in advance.

In step 2033-2, the network side device sends the fifth signaling.

In step 2034, the terminal receives the fifth signaling, and switches the HARQ feedbacks of the third target number of service types from the disabled state to the enabled state according to the fifth signaling.

The fifth signaling is used to instruct to switch the HARQ feedbacks of the third target number of service types from the disabled state to the enabled state.

In order to avoid repeated operations on the state of the HARQ feedback of the HARQ process in the terminal, the network side device may determine that the HARQ feedbacks of the third target number of service types are all in the disabled state after generating the fifth signaling, and then send the fifth signaling to the terminal.

Figure 8:
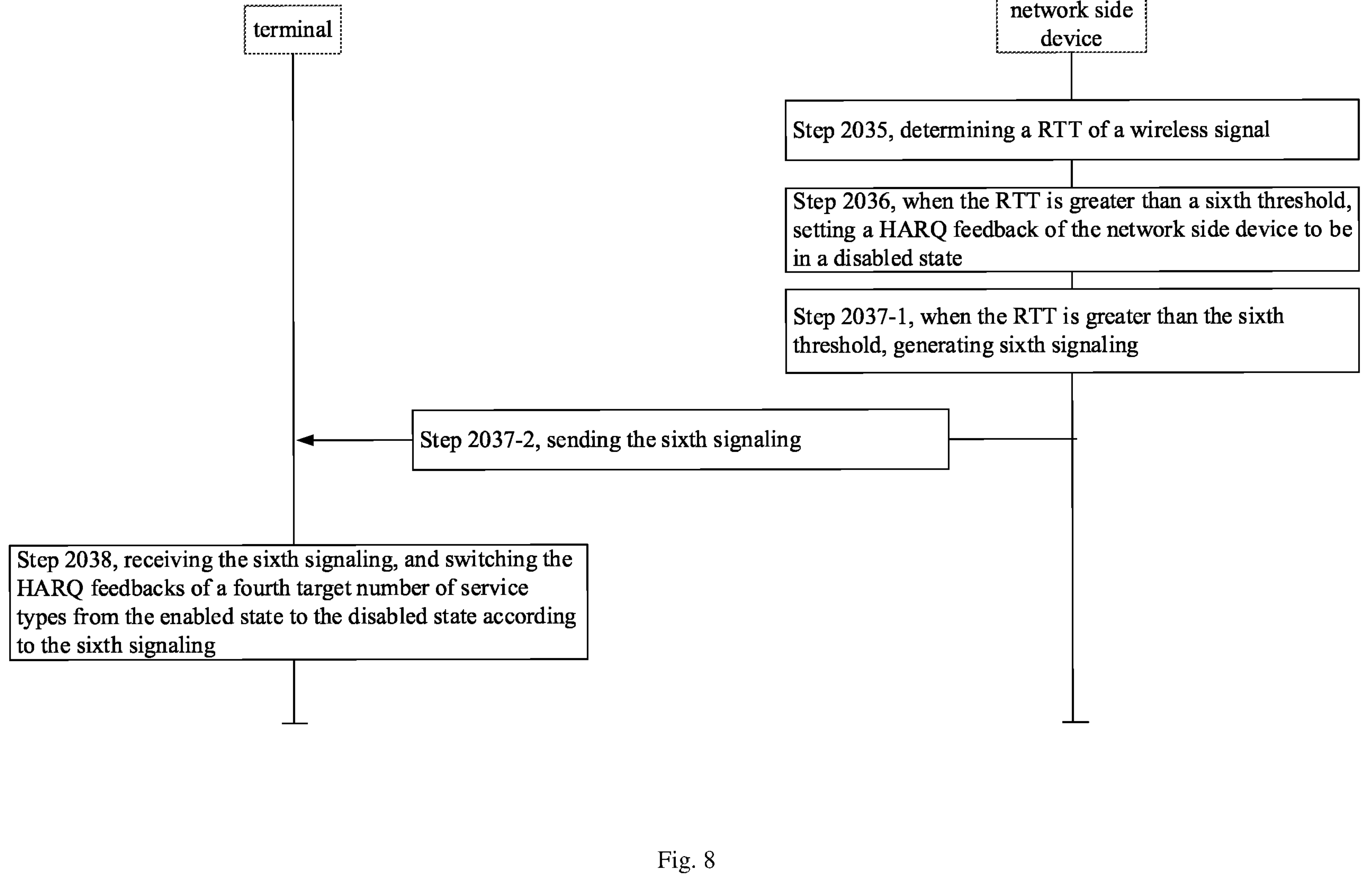
FIG. 8 is a flowchart of a method for setting a HARQ feedback of a terminal to be in a disabled state provided by another embodiment of the present disclosure.

In addition, as shown in FIG. 8, a method for setting a HARQ feedback of a terminal to be in a disabled state may include the following steps.

In step 2035, the network side device determines the RTT of the wireless signal.

For the relevant description about determining the RTT of the wireless signal by the network side device in the step 2035, reference may be made to the above step 2011, which is not repeated by embodiments of the present disclosure.

In step 2036, when the RTT is greater than a sixth threshold, the network side device sets the HARQ feedback of the network side device to be in the disabled state.

The disabled state is a state in which neither the ACK nor the NACK is fed back by the terminal.

In step 2037-1, when the RTT is greater than the sixth threshold, the network side device generates sixth signaling.

The sixth threshold is used to switch the HARQ feedback of each service type among all or part of service types to the disabled state.

In step 2037-2, the network side device sends the sixth signaling.

In step 2088, the terminal receives the sixth signaling, and switches the HARQ feedbacks of the fourth target number of service types from the enabled state to the disabled state according to the sixth signaling.

The sixth signaling is used to instruct to switch the HARQ feedbacks of the fourth target number of service types from the enabled state to the disabled state.

In order to avoid repeated operations on the state of the HARQ feedback of the HARQ process in the terminal, the network side device may determine that the HARQ feedbacks of the fourth target number of service types are all in the enabled state after generating the sixth signaling, and then send the sixth signaling to the terminal.

It should be noted that the sixth threshold is greater than or equal to the fifth threshold.

Optionally, as similar to the above-mentioned first method for transmitting data, before receiving the fifth signaling or the sixth signaling, the terminal further receives other signaling used to indicate an initial state of the HARQ feedback of each service type among the at least two service types supported by the terminal. After receiving the other signaling, the terminal may set the HARQ feedback of each service type according to the other signaling. The other signaling may be the higher layer signaling or the physical layer signaling.

In other optional implementations, the initial state of the HARQ feedback of the service type is set in a predefined manner. For example, the initial state of the HARQ feedback of the service type is set to be the enabled state or the disabled state by setting a default state.

The service types have a one-to-one correspondence with logical channels, and the process of setting the HARQ feedback of the service type is actually a process of setting a HARQ feedback of the logical channel. The fifth signaling instructs to set HARQ feedbacks of the third target number of logical channels to be in the enabled state, and the sixth signaling instructs to set HARQ feedbacks of the fourth target number of logical channels to be in the disabled state.

In a fourth method for transmitting data, the network side device can be a satellite. Since a communication range of the satellite on the ground covers a cell, a RTT between the satellite and the nearest ground position from the satellite in the cell, that is, the minimum RTT, can be used as the basis for setting the HARQ feedback of the terminal to be in the enabled state or the disabled state. Further, the setting the HARQ feedback to be in the enabled state or the disabled state includes setting HARQ feedbacks of all the terminals in the cell to be in the enabled state or the disabled state. In this method, the states of HARQ feedbacks of all the terminals in the cell are set in units of cell.

Figure 9:
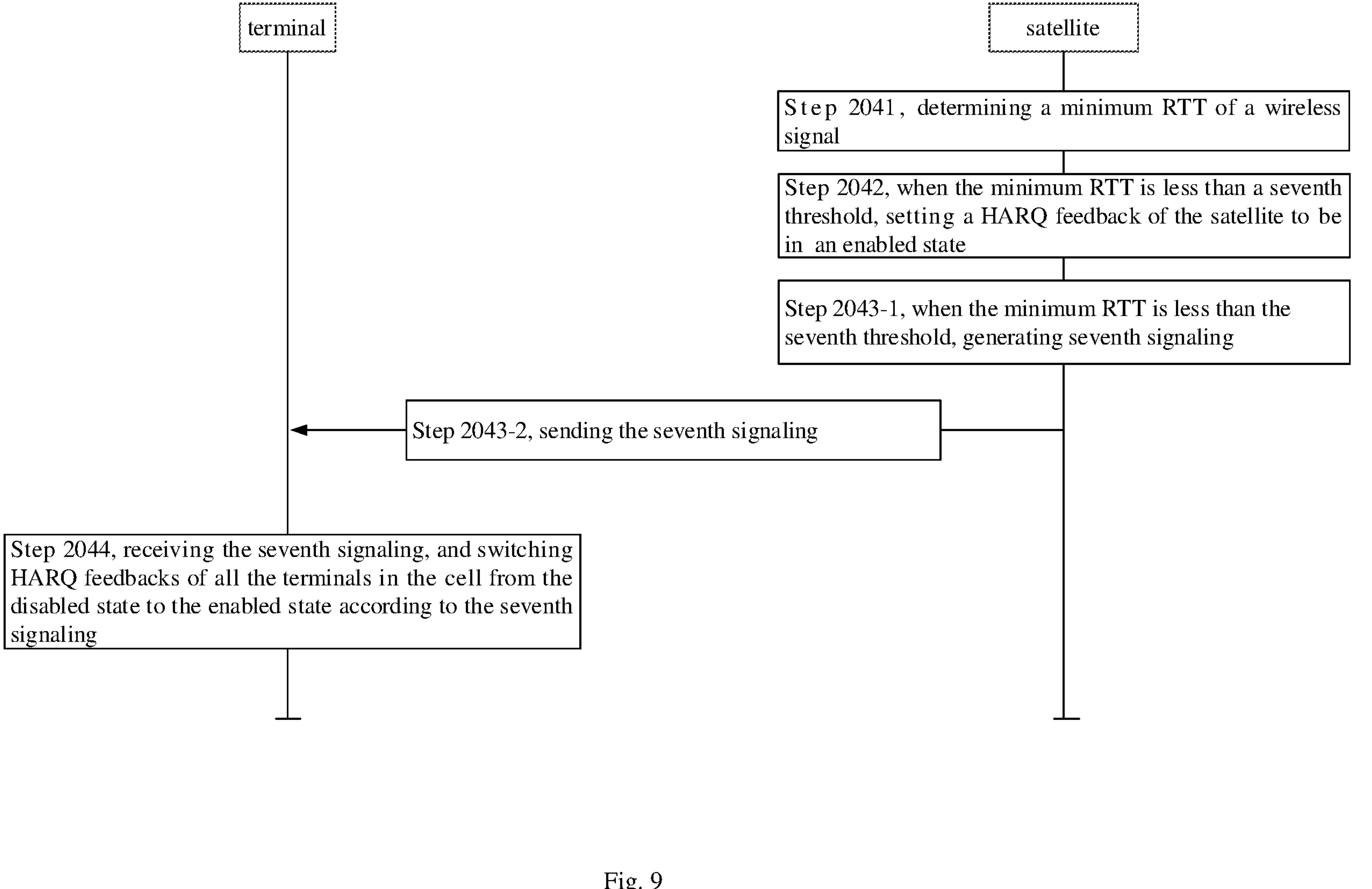
FIG. 9 is a flowchart of a method for setting a HARQ feedback of a terminal to be in an enabled state provided by an embodiment of the present disclosure.

As shown in FIG. 9, a method for setting a HARQ feedback of a terminal to be in an enabled state may include the following steps.

In step 2041, the satellite determines the minimum RTT.

The minimum RTT is a RTT of the wireless signal between the satellite and the target position, and the target position is a ground position closest to the satellite within the communication range of the satellite on the ground (that is, in the cell). In the process of determining the minimum RTT by the satellite, it is assumed that the terminal is located at a ground position closest to the satellite within the communication range of the satellite on the ground, so as to measure the minimum RTT.

In step 2042, when the minimum RTT is less than a seventh threshold, the satellite sets a HARQ feedback of the satellite to be in the enabled state.

The enabled state is a state in which the acknowledgement (ACK) or the negative acknowledgement (NACK) fed back by the terminal is received.

In step 2043-1, when the RTT is less than the seventh threshold, the satellite generates seventh signaling.

The seventh threshold is used to switch the HARQ feedback of the terminal to the enabled state, and the seventh threshold may be stored in the satellite in advance.

In step 2043-2, the satellite sends the seventh signaling.

In order to avoid repeated operations on the state of the HARQ feedback of the terminal, the satellite may determine that the current HARQ feedback of the terminal is in the disabled state after generating the seventh signaling, and then send the seventh signaling to the terminal.

In step 2044, the terminal receives the seventh signaling, and switches the HARQ feedback of the terminal from the disabled state to the enabled state according to the seventh signaling.

The seventh signaling is used to instruct to switch the HARQ feedback of the terminal from the disabled state to the enabled state.

For all terminals in the cell, the seventh signaling can be received, so that all the terminals in the cell can switch respective HARQ feedbacks from the disabled state to the enabled state according to the seventh signaling.

Please note, it is also possible that the HARQ feedbacks of part of the terminals in the cell are switched from the disabled state to the enabled state according to the seventh signaling, which is not limited by embodiments of the present disclosure.

Figure 10:
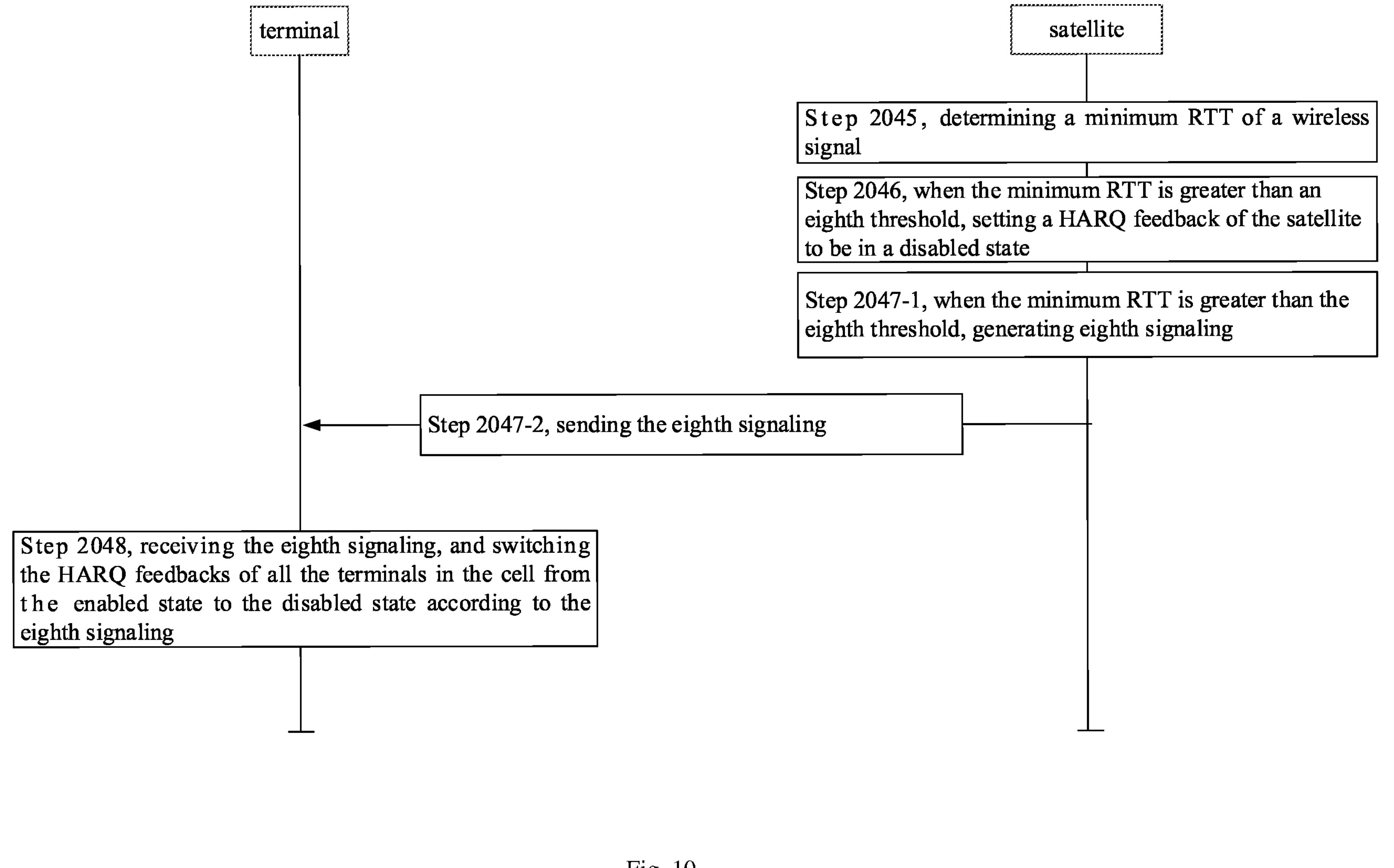
FIG. 10 is a flowchart of a method for setting a HARQ feedback of a terminal to be in a disabled state provided by another embodiment of the present disclosure.

In addition, as shown in FIG. 10, a method for setting a HARQ feedback of a terminal to be in a disabled state may include the following steps.

In step 2045, the satellite determines the minimum RTT.

For the related description about determining the minimum RTT by the satellite in the step 2045, reference may be made to the above step 2041, and details are not repeated here by embodiments of the present disclosure.

In step 2046, when the minimum RTT is greater than an eighth threshold, the satellite sets the HARQ feedback of the satellite to be in the disabled state.

The disabled state is a state in which neither the ACK nor the NACK is fed back by the terminal.

In step 2047-1, when the RTT is greater than the eighth threshold, the satellite generates eighth signaling.

The eighth threshold is used to switch the HARQ feedback of the terminal to the disabled state, and the eighth threshold may be stored in the satellite in advance.

In step 2047-2, the satellite sends the eighth signaling.

In order to avoid repeated operations on the state of the HARQ feedback of the terminal, the satellite may determine that the current HARQ feedback of the terminal is in the enabled state after generating the eighth signaling, and then send the eighth signaling to the terminal.

In step 2048, the terminal receives the eighth signaling, and switches the HARQ feedbacks of all the terminals in the cell from the enabled state to the disabled state according to the eighth signaling.

The eighth signaling is used to instruct to switch the HARQ feedback of the terminal from the enabled state to the disabled state.

Please note, it is also possible that the HARQ feedbacks of part of the terminals in the cell are switched from the enabled state to the disabled state according to the eighth signaling, which is not limited by embodiments of the present disclosure.

It should be noted that the eighth threshold is greater than or equal to the seventh threshold.

Optionally, as similar to the above-mentioned first method for transmitting data, before receiving the seventh signaling or the eighth signaling, the terminal may also receive other signaling used to indicate an initial state of the HARQ feedback of the terminal. After receiving the other signaling, the terminal can set the HARQ feedback of the terminal according to the other signaling.

In other optional implementations, the initial state of the HARQ feedback of the terminal is set in a predefined manner. For example, the initial state of the HARQ feedback of the terminal is set to be the enabled state or the disabled state by setting a default state.

The seventh signaling, the eighth signaling, and the other signaling may all be system messages. The system message may be one of a master information block (MIB), a system information block (SIB), or a remaining system message (RMSI).

It should also be noted that the above fourth method for transmitting data is to set the states of HARQ feedbacks of all the terminals in the cell in units of cell. That is, the HARQ feedback of each HARQ process among all the HARQ processes supported by each terminal is set to be in the enabled state or the disabled state. In other optional implementations, reference may be made to the above second and third methods for transmitting data. That is, the HARQ feedbacks of all or part of HARQ processes among the at least one HARQ process supported by the terminal are set to be in the enabled state or the disabled state in units of HARQ process. Alternatively, the HARQ feedbacks of all or part of service types among the at least one service type received by the terminal are set to be in the enabled state or the disabled state in units of service type.

Figure 11:
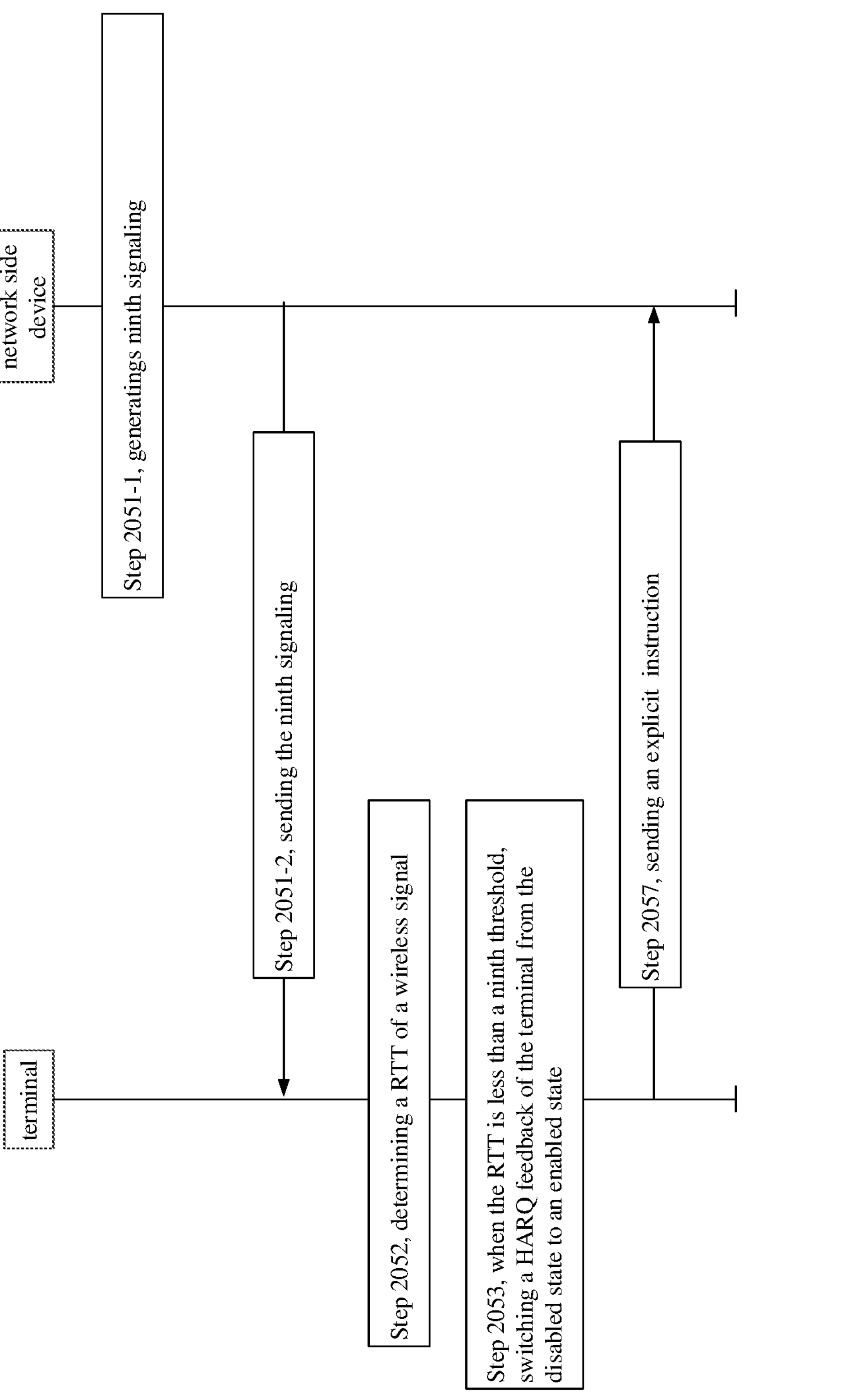
FIG. 11 is a flowchart of a method for setting a HARQ feedback of a terminal to be in an enabled state provided by an embodiment of the present disclosure.

In a second method for determining RTT, the terminal measures the RTT required for the wireless signal transmission between the terminal and the network side device. Optionally, as shown in FIG. 11, a method for setting a HARQ feedback of a terminal to be in an enabled state may include the following steps.

In step 2051-1, the network side device generates ninth signaling.

The ninth signaling is used to indicate a ninth threshold, which ninth threshold is used to switch the HARQ feedback of the terminal to the enabled state.

In step 2051-2, the network side device sends the ninth signaling.

In step 2052, the terminal determines the RTT of the wireless signal.

The terminal may have a self-positioning capability, and the terminal can measure the RTT required for the wireless signal transmission between the terminal and the network side device by means of the self-positioning capability.

In step 2053, when the RTT is less than the ninth threshold, the HARQ feedback of the terminal is switched from the disabled state to the enabled state.

After receiving the ninth signaling, the terminal compares the determined RTT of the wireless signal with the ninth threshold indicated by the ninth signaling. When the RTT is less than the ninth threshold, the HARQ feedback of the terminal is switched from the disabled state to the enabled state.

Figure 12:
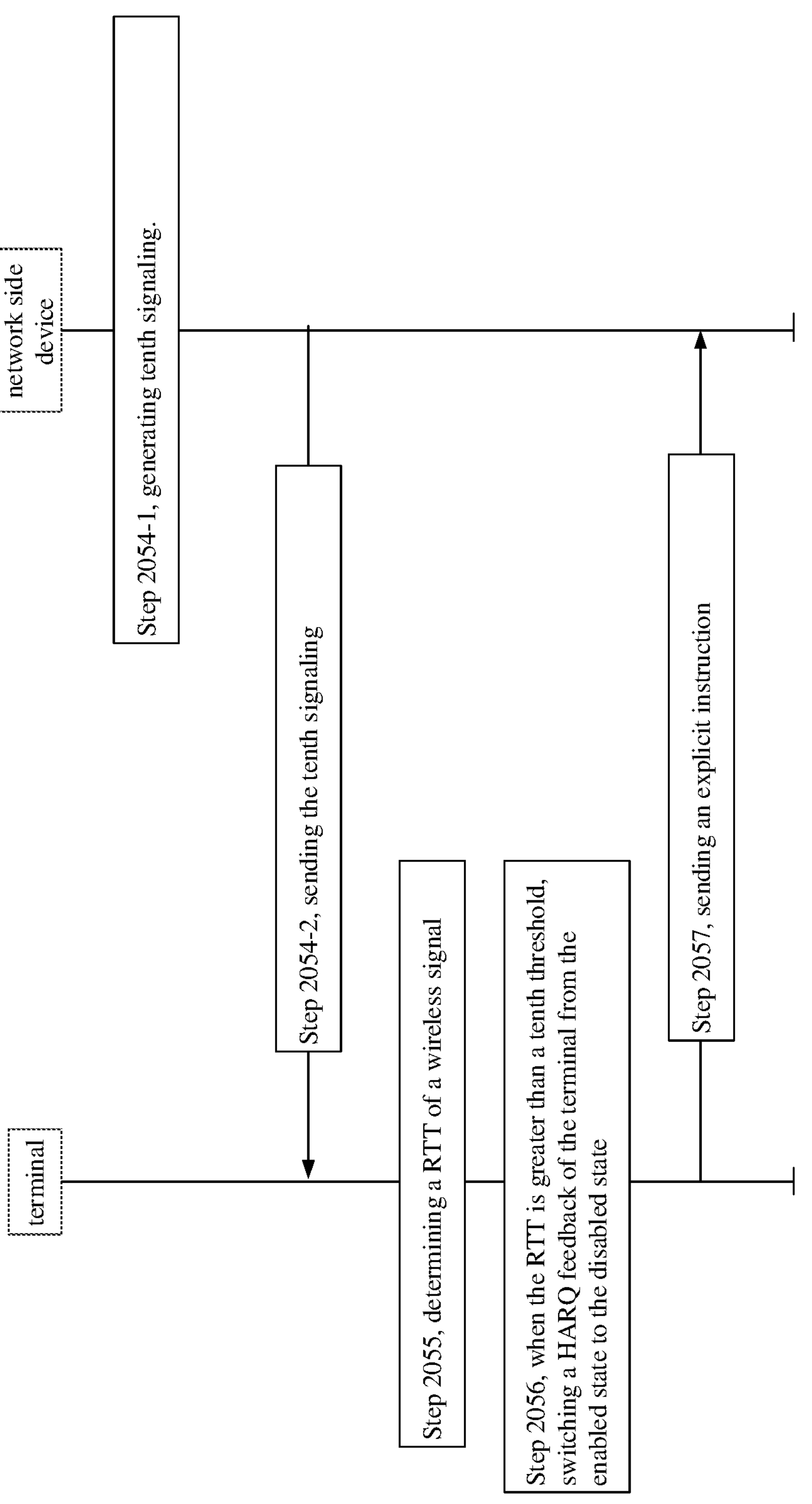
FIG. 12 is a flowchart of a method for setting a HARQ feedback of a terminal to be in a disabled state provided by another embodiment of the present disclosure.

In addition, as shown in FIG. 12, a method for setting a HARQ feedback of a terminal to be in a disabled state may include the following steps.

In step 2054-1, the network side device generates tenth signaling.

The tenth signaling is used to indicate a tenth threshold, which tenth threshold is used to switch the HARQ feedback of the terminal to the disabled state.

In step 2054-1, the network side device sends the tenth signaling.

In step 2055, the terminal determines the RTT of the wireless signal.

For the relevant description about determining the RTT of the wireless signal by the network side device in the step 2055, reference may be made to the foregoing step 2052, which is not repeated here by embodiments of the present disclosure.

In step 2056, when the RTT is greater than the tenth threshold, the HARQ feedback of the terminal is switched from the disabled state to the enabled state.

After receiving the tenth signaling, the terminal compares the determined RTT of the wireless signal with the tenth threshold indicated by the tenth signaling. When the RTT is greater than the tenth threshold, the HARQ feedback of the terminal is switched from the enabled state to the disabled state.

The tenth threshold is greater than or equal to the ninth threshold. As similar to the first method for transmitting data in the above-mentioned first method for determining RTT, before receiving the ninth signaling and the tenth signaling, the terminal may also receive other signaling used to indicate an initial state of the HARQ feedback of the terminal. After receiving the other signaling, the terminal can set the HARQ feedback of the terminal according to the other signaling. The ninth signaling, the tenth signaling, and the other signaling may be the higher layer signaling or the physical layer signaling.

Optionally, as shown in FIGS. 11 and 12, after the terminal switches its HARQ feedback from the disabled state to the enabled state, or after the terminal switches its HARQ feedback from the enabled state to the disabled state, the method may also include the following steps.

In step 2057, an explicit instruction is sent to the network side device.

The explicit instruction may be the RRC signaling or the MAC CE, and the explicit instruction is used to inform the network side device of the current state of the HARQ feedback of the terminal. The explicit instruction can be used to cause the network side device to set its HARQ feedback to be in the same state as the current state of the HARQ feedback of the terminal.

It should also be noted that the above method for transmitting data is to set the state of the HARQ feedback in units of terminal. That is, for each terminal, the HARQ feedback of each HARQ process among all the HARQ processes supported by the terminal is set to be in the enabled state or the disabled state. In other optional implementations, reference may be made to the above second and third methods for transmitting data. That is, the HARQ feedbacks of all or part of HARQ processes among the at least one HARQ process supported by the terminal are set to be in the enabled state or the disabled state in units of HARQ process. Alternatively, the HARQ feedbacks of all or part of service types among the at least one service type received by the terminal are set to be in the enabled state or the disabled state in units of service type.

In summary, in the method for transmitting data provided by an embodiment of the present disclosure, the HARQ feedback function in the HARQ mechanism of the terminal is flexibly set according to the RTT of the wireless signal. Since the HARQ feedback of the terminal can be selectively turned on or off according to the RRT of the wireless signal, unnecessary burdens on the terminal are avoided. Moreover, when the HARQ feedback of the terminal is in an off state (that is, the disabled state), a transmission delay of the wireless signal can be reduced.

In the method for transmitting data provided by an embodiment of the present disclosure, when the RTT of the wireless signal transmitted between the terminal and the network side device is large, the HARQ feedback of the terminal is set to be in the disabled state, thereby achieving faster retransmission. This ensures the reliability of data transmission in addition to ensuring the delay of data transmission. When the RTT of the wireless signal transmitted between the terminal and the network side device is small, the HARQ feedback of the terminal is set to be in the enabled state, so that the network side device can determine to retransmit data or transmit new data according to whether the wireless signal is correctly decoded, ensuring the reliability of data transmission. Moreover, since the state of the HARQ feedback is flexibly set based on the RTT, the system resource can be used more effectively, reducing unnecessary resource waste.

Figure 13:
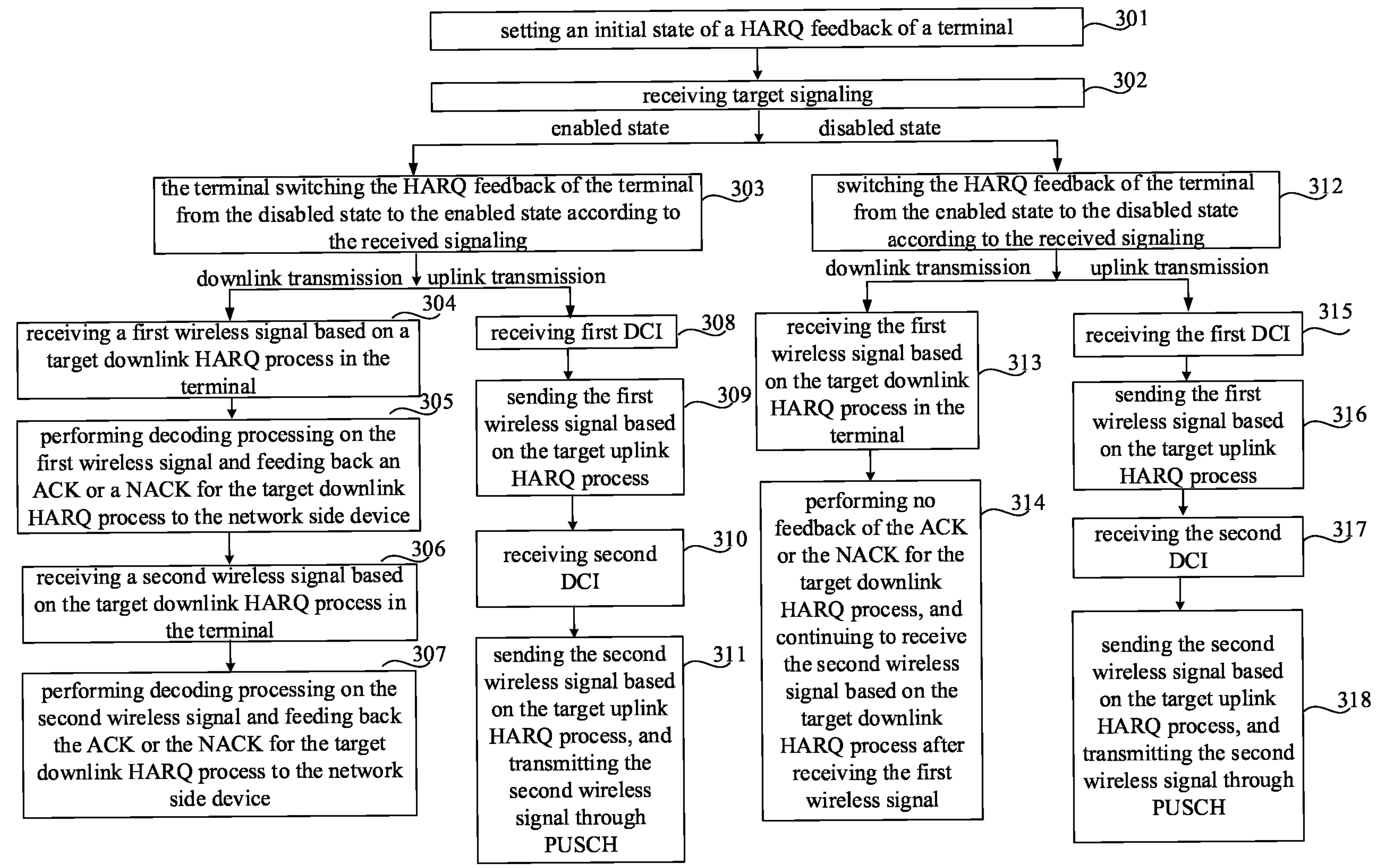
FIG. 13 is a flowchart of a method for transmitting data provided by an embodiment of the present disclosure.

The method for transmitting data provided by an embodiment of the present disclosure will be further described below in conjunction with the uplink transmission process and the downlink transmission process of the wireless signal. In order to facilitate readers to better understand the present disclosure, the following embodiments will be described by taking transmitting the wireless signal (that is, the first wireless signal and the second wireless signal) twice from the perspective of the terminal side as an example. As shown in FIG. 13, the method includes the following steps.

In step 301, the initial state of the HARQ feedback of the terminal is set.

The initial state of the HARQ feedback of the terminal is set to be the enabled state or the disabled state according to the signaling sent by the network side device. Alternatively, the terminal sets the initial state of the HARQ feedback of the terminal to be the enabled state or the disabled state as predefined.

In step 302, the target signaling is received.

The target signaling is generated by the network side device according to the RTT of the wireless signal. The target signaling can be used to instruct to set the HARQ feedback of the terminal to be in the enabled state or the disabled state, or to instruct to set the HARQ feedbacks of all or part of the HARQ processes among the at least one HARQ process supported by the terminal to be in the enabled state or the disabled state, or to instruct to set the HARQ feedbacks of all or part of the service types among the at least one service type received by the terminal to be in the enabled state or the disabled state.

The terminal sets its HARQ feedback to be in the same state as the HARQ feedback of the network side device by receiving the target signaling, so as to ensure the effective execution of the method for transmitting data provided by embodiments of the present disclosure. The target signaling may be any one of the foregoing first signaling to tenth signaling.

If the initial state of the terminal is the disabled state, and the target signaling is received to switch the HARQ feedback of the terminal to the enabled state, step 303 is executed after the step 302. If the initial state of the terminal is the enabled state, and the target signaling is received to switch the HARQ feedback of the terminal to the disabled state, then step 312 is executed after the step 302.

In step 303, the terminal switches the HARQ feedback of the terminal from the disabled state to the enabled state according to the received signaling.

If the terminal is in downlink transmission, step 304 is executed after the step 303. If the terminal is in uplink transmission, step 308 is executed after the step 303.

In step 304, the first wireless signal is received based on the target downlink HARQ process in the terminal.

The first wireless signal is transmitted through a physical downlink shared channel (PDSCH). The target downlink HARQ process is any one of the downlink HARQ processes in the terminal.

In step 305, decoding processing is performed on the first wireless signal, and the ACK or NACK for the target downlink HARQ process is fed back to the network side device.

When the terminal successfully decodes the first wireless signal, it feeds back the ACK to the network side device. In contrast, if the terminal fails to decode the first wireless signal, it feeds back the NACK to the network side device.

In step 306, a second wireless signal is received based on the target downlink HARQ process in the terminal.

The second wireless signal is transmitted through the PDSCH. The target downlink HARQ process for receiving the first wireless signal and the target downlink HARQ process for receiving the second wireless signal may be the same downlink HARQ process, or may be different downlink HARQ processes.

In step 307, decoding processing is performed on the second wireless signal, and the ACK or NACK for the target downlink HARQ process is fed back to the network side device.

When the terminal successfully decodes the second wireless signal, it may feed the ACK back to the network side device. In contrast, if the terminal fails to decode the second wireless signal, it may feed the NACK back to the network side device.

In the step 308, the first DCI is received.

The first DCI is received through a physical downlink control channel (PDCCH), and is used to schedule a target uplink HARQ process. The first DCI includes a position of an allocated time-frequency domain resource, a MCS, an ID of the used uplink HARQ process, and initial transmission and retransmission indications, etc., and can be used to schedule the target uplink HARQ process.

In step 309, the first wireless signal is sent based on the target uplink HARQ process.

The first wireless signal is transmitted through a physical uplink shared channel (PUSCH). The target uplink HARQ process is any one of the uplink HARQ processes in the terminal.

In step 310, second DCI is received.

The second DCI is received through the PDCCH, and the second DCI includes the position of the allocated time-frequency domain resource, the MCS, the ID of the used uplink HARQ process, and the initial transmission and retransmission indications, etc., and can be used to schedule the target uplink HARQ process.

In step 311, a second wireless signal is sent based on the target uplink HARQ process, and the second wireless signal is transmitted through the PUSCH.

The target uplink HARQ process for receiving the first wireless signal and the target uplink HARQ process for receiving the second wireless signal may be the same uplink HARQ process, or may be different uplink HARQ processes. If the target uplink HARQ process for receiving the first wireless signal and the target uplink HARQ process for receiving the second wireless signal are the same uplink HARQ process, the second DCI is sent by the network side device after decoding the first wireless signal. That is, the terminal needs to wait for at least a certain time for the network side device to decode the first wireless signal, before it can continue using the same target uplink HARQ process to send the second wireless signal.

In step 312, the HARQ feedback of the terminal is switched from the enabled state to the disabled state according to the received signaling.

If the terminal is in downlink transmission, step 313 is executed after the step 312. If the terminal is in uplink transmission, step 315 is executed after the step 312.

In step 313, the first wireless signal is received based on the target downlink HARQ process in the terminal.

The first wireless signal is transmitted through the PDSCH. The target downlink HARQ process is at least one downlink HARQ process of the terminal.

In step 314, the ACK or NACK for the target downlink HARQ process is not fed back, and after the first wireless signal is received, it is continued to receive the second wireless signal based on the target downlink HARQ process.

The second wireless signal is transmitted through the PDSCH.

In step 315, the first DCI is received.

The first DCI is used to schedule the target uplink HARQ process, and the target uplink HARQ process is at least one uplink HARQ process of the terminal. The first DCI is received through the PDCCH and used to schedule the target uplink HARQ process for transmitting the first wireless signal. The first DCI includes the position of the allocated time-frequency domain resource, the MCS, the ID of the used uplink HARQ process, and the initial transmission and retransmission indications, etc., and can be used to schedule the target uplink HARQ process.

In step 316, the first wireless signal is sent based on the target uplink HARQ process, and the first wireless signal is transmitted through the PUSCH.

In step 317, the second DCI is received.

The second DCI is sent by the network side device without considering a decoding result of the first wireless signal, and the second DCI is used to schedule the target uplink HARQ process. The second DCI is received through the PDCCH and used to schedule the target uplink HARQ process for transmitting the second wireless signal. The second DCI includes the position of the allocated time-frequency domain resource, the MCS, the ID of the used uplink HARQ process, and the initial transmission and retransmission indications, etc., and can be used to schedule the target uplink HARQ process.

The target uplink HARQ process for receiving the first wireless signal and the target uplink HARQ process for receiving the second wireless signal may be the same uplink HARQ process, or may be different uplink HARQ processes.

When the target uplink HARQ process for receiving the first wireless signal and the target uplink HARQ process for receiving the second wireless signal are the same uplink HARQ process, it can be seen that in the method for transmitting data provided by embodiments of the present disclosure, the terminal can continuously receive the DCI used to schedule the same target uplink HARQ process if the HARQ feedback of the terminal is in the deactivated state.

In step 318, the second wireless signal is sent based on the target uplink HARQ process, and the second wireless signal is transmitted through the PUSCH.

When the terminal is in the disabled state, in the process of downlink transmission, for a target downlink HARQ process, the network side device can continue to use the same target downlink HARQ process for downlink data transmission, without waiting for the ACK or NACK with regard to a certain wireless signal fed back by the terminal. Accordingly, the terminal uses the downlink HARQ process for downlink transmission, without the need for waiting for the network side device having received the ACK or NACK fed back for the target downlink HARQ process by the terminal. Since there is provided the disenabled state for the HARQ feedback, which effectively reduces the transmission delay compared to the enabled state, the pressure on the terminal is effectively reduced, and the signal transmission delay is reduced. In the process of uplink transmission, for a target uplink HARQ process, since the network side device does not need to wait for the first wireless signal as received before it sends the DCI for scheduling the target uplink HARQ process to the terminal, it can directly schedule the same target uplink HARQ process for transmitting the second wireless signal after the transmission of the first wireless signal is scheduled. Accordingly, after the terminal sends the first wireless signal, it can continue to send the second wireless signal, without waiting for receiving a completion indication about decoding of the first wireless signal from the network side device. Since there is provided the disenabled state for the HARQ feedback, which effectively reduces the transmission delay compared to the enabled state, the pressure on the terminal is effectively reduced, and the signal transmission delay between the terminal and the network side device is reduced.

It should be noted that for the first method for transmitting data in the above-mentioned first method for determining RTT, the target downlink HARQ process is any one among all the downlink HARQ processes supported by the terminal. For the second method for transmitting data in the above-mentioned first method for determining RTT, the target downlink HARQ process is any one among the first target number of uplink HARQ processes indicated by the third signaling. For the third method for transmitting data in the above-mentioned first method for determining RTT, the target downlink HARQ process is any one among the third target number of service types indicated by the fifth signaling. For the fourth method for transmitting data in the above-mentioned first method for determining RTT, the target downlink HARQ process is any one among all the downlink HARQ processes supported by all the terminals in the cell covered by the ground communication of the satellite. For the method for transmitting data in the above-mentioned second method for determining RTT, the target downlink HARQ process is any one among all the downlink HARQ processes supported by the terminal.

Similarly, for the first method for transmitting data in the above-mentioned first method for determining RTT, the target uplink HARQ process is any one among all the uplink HARQ processes supported by the terminal. For the second method for transmitting data in the above-mentioned first method for determining RTT, the target uplink HARQ process is any one among the second target number of uplink HARQ processes indicated by the fourth signaling. For the third method for transmitting data in the above-mentioned first method for determining RTT, the target uplink HARQ process is any one among the fourth target number of service types indicated by the sixth signaling. For the fourth method for transmitting data in the above-mentioned first method for determining RTT, the target uplink HARQ process is any one among all the uplink HARQ processes supported by all the terminals in the cell covered by the ground communication of the satellite. For the method for transmitting data in the above-mentioned second method for determining RTT, the target uplink HARQ process is any one among all the uplink HARQ processes supported by the terminal.

Steps performed by the terminal in the foregoing embodiments may be implemented as a method for transmitting data on the terminal side. Steps performed by the network side device in the foregoing embodiments may be implemented as a method for transmitting data on the network side device.

Figure 14:
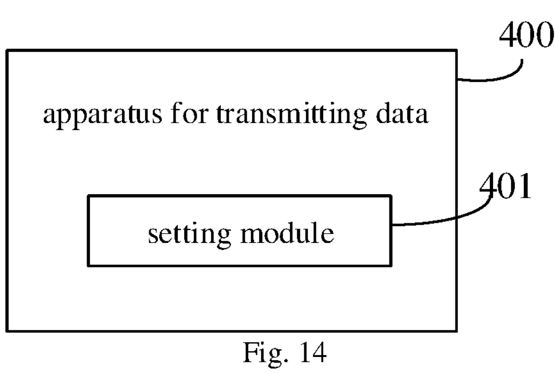
FIG. 14 is a block diagram of an apparatus for transmitting data provided by an embodiment of the present disclosure.

FIG. 14 shows a block diagram of an apparatus for transmitting data provided by an embodiment of the present disclosure, and the apparatus 400 includes: a setting module 401, configured to set a HARQ feedback of the apparatus to be in an enabled state or a disabled state according to a round trip time (RTT) of a wireless signal.

The enabled state is a state in which an acknowledgement (ACK) or a negative acknowledgement (NACK) is fed back, and the disabled state is a state in which neither the ACK nor the NACK is fed back.

In summary, in the apparatus for transmitting data provided by an embodiment of the present disclosure, the HARQ feedback function in the HARQ mechanism of the terminal is flexibly set according to the RTT of the wireless signal. Since the HARQ feedback of the terminal can be selectively turned on or off according to the RRT of the wireless signal, unnecessary burdens on the terminal are avoided. Moreover, when the HARQ feedback of the terminal is in an off state (that is, the disabled state), a transmission delay of the wireless signal can be reduced.

Optionally, the RTT is determined by a network side device. Alternatively, the RTT is determined by the apparatus.

Figure 15:
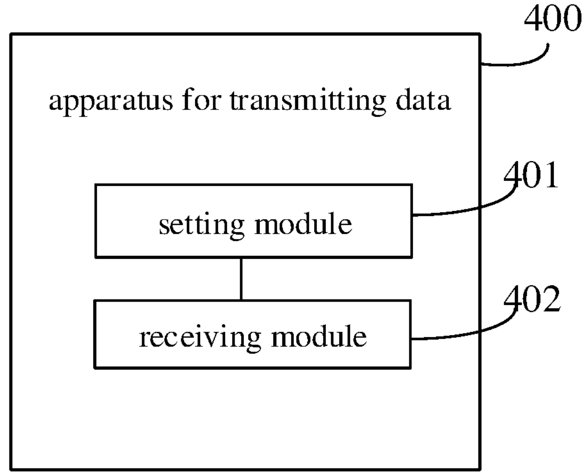
FIG. 15 is a block diagram of another apparatus for transmitting data provided by an embodiment of the present disclosure.

Optionally, FIG. 15 shows a block diagram of an apparatus for transmitting data provided by an embodiment of the present disclosure. The apparatus further includes: a receiving module 402. The receiving module 402 is configured to receive target signaling, and the target signaling is generated by the network side device according to the RTT of the wireless signal. The setting module 401 is configured to set the HARQ feedback of the terminal to be in the enabled state or the disabled state according to the target signaling.

Optionally, the target signaling is used to instruct to set HARQ feedbacks of all or part of HARQ processes among at least one HARQ process supported by the apparatus to be in the enabled state or the disabled state. Alternatively, the target signaling is used to instruct to set HARQ feedbacks of all or part of service types among at least one service type received by the apparatus to be in the enabled state or the disabled state.

Optionally, the receiving module 402 is configured to receive first signaling. The first signaling is used to instruct to switch the HARQ feedback of the apparatus from the disabled state to the enabled state. Alternatively, the receiving module 402 is configured to receive second signaling, and the second signaling is used to indicate to instruct the HARQ feedback of the apparatus from the enabled state to the disabled state.

The first signaling and the second signaling are both generated by the network side device according to the RTT.

Optionally, the first signaling is generated by the network side device when determining that the RTT is less than a first threshold; and the second signaling is generated by the network side device when determining that the RTT is greater than a second threshold, wherein the second threshold is greater than or equal to the first threshold.

Optionally, the receiving module 402 is configured to receive third signaling, and the third signaling is used to instruct to switch HARQ feedbacks of a first target number of HARQ processes from the disabled state to the enabled state. Alternatively, the receiving module 402 is configured to receive fourth signaling, and the fourth signaling is used to instruct to switch HARQ feedbacks of a second target number of HARQ processes from the enabled state to the disabled state. The third signaling and the fourth signaling are both generated by the network side device according to the RTT.

Optionally, the third signaling is generated by the network side device when determining that the RTT is less than a third threshold; and the fourth signaling is generated by the network side device when determining that the RTT is greater than a fourth threshold, wherein the fourth threshold is greater than or equal to the third threshold.

Optionally, the third signaling is used to indicate a process number of each HARQ process among the first target number of HARQ processes; and the fourth signaling is used to indicate a process number of each HARQ process among the second target number of HARQ processes.

Optionally, the receiving module 402 is configured to receive fifth signaling, and the fifth signaling is used to instruct to switch HARQ feedbacks of a third target number of service types from the disabled state to the enabled state. Alternatively, the receiving module 402 is configured to receive sixth signaling, and the sixth signaling is used to instruct to switch HARQ feedbacks of a fourth target number of service types from the enabled state to the disabled state. The fifth signaling and the sixth signaling are both generated by the network side device according to the RTT.

Optionally, the fifth signaling is generated by the network side device when determining that the RTT is less than a fifth threshold; and the sixth signaling is generated by the network side device when determining that the RTT is greater than a sixth threshold, wherein the sixth threshold is greater than or equal to the fifth threshold.

Optionally, the network side device is a satellite, and a communication range of the satellite on the ground covers a cell.

Optionally, the RTT is determined by the satellite. The setting module 401 is configured to set the HARQ feedback of the terminal to be in the enabled state or the disabled state according to a minimum RTT. The terminal is a terminal in the cell. The minimum RTT is a RTT of the wireless signal between the satellite and a target position, and the target position is a position on ground which is closest to the satellite in the cell.

Optionally, the receiving module 402 is configured to receive seventh signaling, and the seventh signaling is used to instruct to switch the HARQ feedback of the apparatus from the disabled state to the enabled state. Alternatively, the receiving module 402 is configured to receive eighth signaling, and the eighth signaling is used to instruct to switch the HARQ feedback of the apparatus from the enabled state to the disabled state. The seventh signaling and the eighth signaling are both generated by the satellite according to the minimum RTT.

Optionally, the seventh signaling is generated by the satellite when determining that the minimum RTT is less than a seventh threshold; and the eighth signaling is generated by the satellite when determining that the minimum RTT is greater than the eighth threshold, wherein the eighth threshold is greater than or equal to the seventh threshold.

Optionally, the receiving module 402 is configured to receive ninth signaling, and the ninth signaling is used to indicate a ninth threshold. The setting module is configured to determine the RTT of the wireless signal; and switch the HARQ feedback of the apparatus from the disabled state to the enabled state when the RTT is less than the ninth threshold. Alternatively, the receiving module 402 is configured to receive tenth signaling, and the tenth signaling is used to indicate a tenth threshold. The setting module is configured to determine the RTT of the wireless signal; and switch the HARQ feedback of the apparatus from the enabled state to the disabled state when the RTT is greater than the tenth threshold. The tenth threshold is greater than or equal to the ninth threshold.

Optionally, the HARQ feedback of the apparatus is in the disabled state. The receiving module 402 is configured to receive a first wireless signal based on a target downlink HARQ process, and the target downlink HARQ process is at least one downlink HARQ process of the terminal. The receiving module 402 is configured to perform no feedback of the ACK or NACK for the target downlink HARQ process, and continue to receive a second wireless signal based on the target downlink HARQ process after receiving the first wireless signal.

Figure 16:
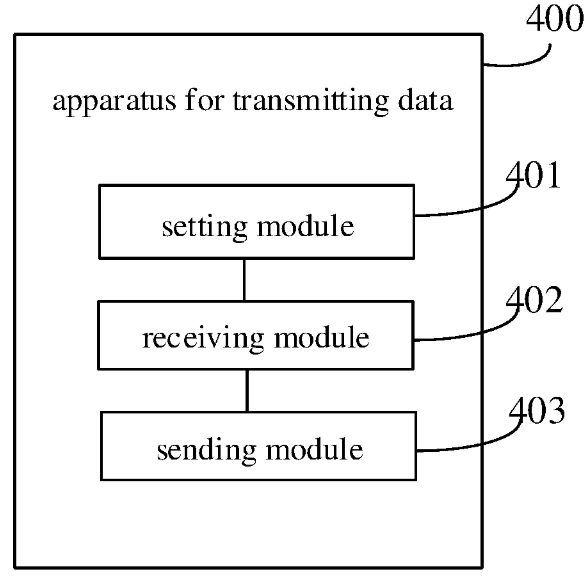
FIG. 16 is a block diagram of another apparatus for transmitting data provided by an embodiment of the present disclosure.

Optionally, the HARQ feedback of the apparatus is in the disabled state. FIG. 16 shows a block diagram of an apparatus for transmitting data provided by an embodiment of the present disclosure. The apparatus further includes a sending module 403. The receiving module 402 is configured to receive first downlink control information (DCI), and the first DCI is used to schedule a target uplink HARQ process.

The target uplink HARQ process is at least one uplink HARQ process of the terminal. The sending module 403 is configured to send a first wireless signal based on the target uplink HARQ process. The receiving module 402 is configured to receive second DCI, and the second DCI is sent by the network side device without considering a decoding result of the first wireless signal. The second DCI is used to schedule the target uplink HARQ process. The sending module 403 is configured to send a second wireless signal based on the target uplink HARQ process.

Optionally, the first signaling or the second signaling is radio resource control (RRC) signaling, a medium access control (MAC) control unit (CE), or downlink control information (DCI). Alternatively, the third signaling or the fourth signaling is the RRC signaling, the MAC CE, or the DCI. Alternatively, the fifth signaling or the sixth signaling is the RRC signaling, the MAC CE, or the DCI. Alternatively, the seventh signaling or the eighth signaling is a system broadcast message. Alternatively, the ninth signaling or the tenth signaling is the RRC signaling, the MAC CE, or the DCI.

In summary, in the apparatus for transmitting data provided by an embodiment of the present disclosure, the HARQ feedback function in the HARQ mechanism of the terminal is flexibly set according to the RTT of the wireless signal. Since the HARQ feedback of the terminal can be selectively turned on or off according to the RRT of the wireless signal, unnecessary burdens on the terminal are avoided. When the HARQ feedback of the terminal is in an off state (that is, the disabled state), a transmission delay of the wireless signal can be reduced. Moreover, in the method for transmitting data provided by embodiments of the present disclosure, when the RTT of the wireless signal transmitted between the terminal and the network side device is large, the HARQ feedback of the terminal is set to be in the disabled state. Thereby, faster retransmission is achieved, and the reliability of data transmission is ensured in addition to ensuring the delay of data transmission. When the RTT of the wireless signal transmitted between the terminal and the network side device is small, the HARQ feedback of the terminal is set to be in the enabled state, so that the network side device can determine to retransmit data or transmit new data according to whether the wireless signal is correctly decoded, ensuring the reliability of data transmission. Moreover, since the state of the HARQ feedback is flexibly set based on the RTT, the system resource can be used more effectively, reducing unnecessary resource waste.

In addition, when the terminal is in the disabled state, in the process of downlink transmission, for a target downlink HARQ process, the network side device can continue to use the same target downlink HARQ process for downlink data transmission, without waiting for the ACK or NACK with regard to a certain wireless signal fed back by the terminal. Accordingly, the terminal uses the downlink HARQ process for downlink transmission, without the need for waiting for the network side device having received the ACK or NACK fed back for the target downlink HARQ process by the terminal. Since there is provided the disenabled state for the HARQ feedback, which effectively reduces the transmission delay compared to the enabled state, the pressure on the terminal is effectively reduced, and the signal transmission delay is reduced. In the process of uplink transmission, for a target uplink HARQ process, since the network side device does not need to wait for the first wireless signal as received before it sends the DCI for scheduling the target uplink HARQ process to the terminal, it can directly schedule the same target uplink HARQ process for transmission of the second wireless signal after the transmission of the first wireless signal is scheduled. Accordingly, after the terminal sends the first wireless signal, it can continue to send the second wireless signal, without waiting for receiving a completion indication about decoding of the first wireless signal from the network side device. Since there is provided the disenabled state for the HARQ feedback, which effectively reduces the transmission delay compared to the enabled state, the pressure on the terminal is effectively reduced, and the signal transmission delay between the terminal and the network side device is reduced.

Figure 17:
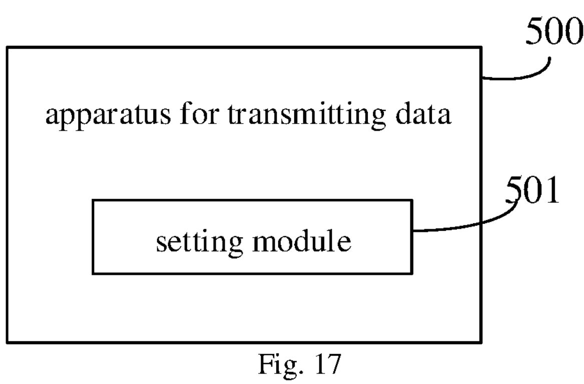
FIG. 17 is a block diagram of another apparatus for transmitting data provided by an embodiment of the present disclosure.

FIG. 17 shows a block diagram of an apparatus 500 for transmitting data provided by an embodiment of the present disclosure. The apparatus 500 includes: a setting module 501, configured to set a HARQ feedback of the apparatus to be in an enabled state or a disabled state according to a RTT of a wireless signal. The enabled state is a state in which an ACK or a NACK fed back by a terminal is received, and the disabled state is a state in which neither the ACK nor the NACK is fed back by the terminal.

In summary, in the apparatus for transmitting data provided by an embodiment of the present disclosure, the target signaling can be sent to the terminal according to the RTT of the wireless signal. The target signaling can be used to flexibly set the HARQ feedback function in the HARQ mechanism of the terminal and the network side device. Since the HARQ feedback of the terminal can be selectively turned on or off according to the RRT of the wireless signal, unnecessary burdens on the terminal are avoided. Moreover, when the HARQ feedback of the terminal is in an off state (that is, the disabled state), a transmission delay of the wireless signal can be reduced.

Optionally, the RTT is determined by the apparatus. Alternatively, the RTT is determined by the terminal.

Figure 18:
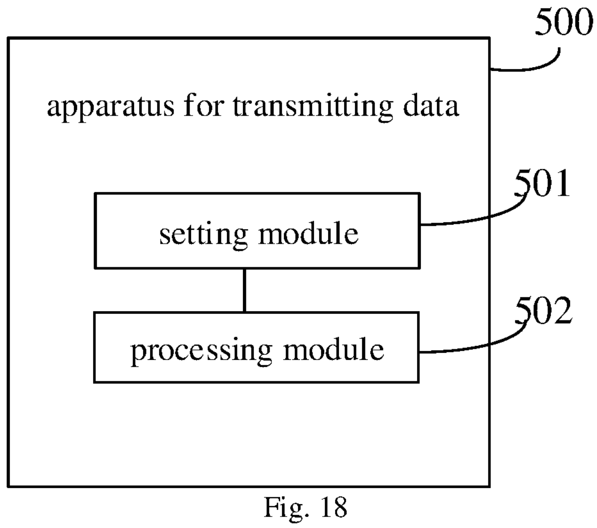
FIG. 18 is a block diagram of another apparatus for transmitting data provided by an embodiment of the present disclosure.

Optionally, FIG. 18 shows a block diagram of an apparatus 500 for transmitting data provided by an embodiment of the present disclosure. The apparatus further includes: a processing module 502, configured to determine the RTT of the wireless signal. The setting module 501 is configured to set the HARQ feedback of the apparatus to be in the enabled state or the disabled state according to the RTT.

Figure 19:
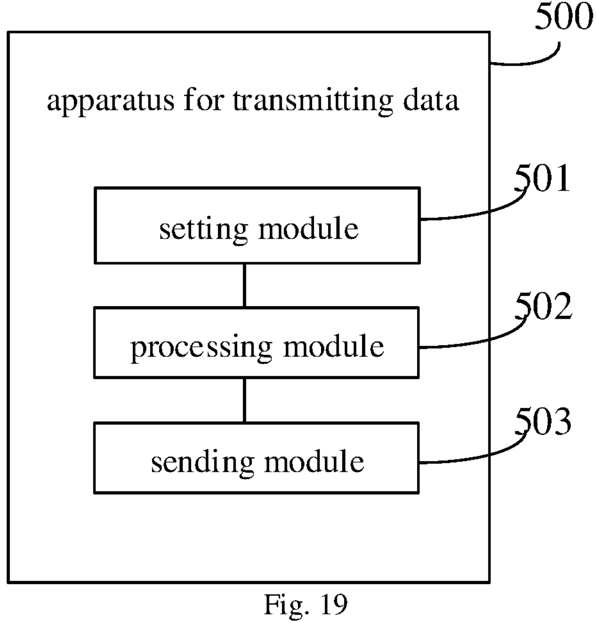
FIG. 19 is a block diagram of another apparatus for transmitting data provided by an embodiment of the present disclosure.

Optionally, FIG. 19 shows a block diagram of an apparatus 500 for transmitting data provided by an embodiment of the present disclosure. The apparatus further includes a sending module 503. The processing module 502 is configured to generate target signaling according to the RTT. The sending module 503 is configured to send the target signaling. The target signaling is used to set the HARQ feedback of the terminal to be in the enabled state or the disabled state.

Optionally, the processing module 502 is configured to generate first signaling when the RTT is less than a first threshold, and the first signaling is used to switch the HARQ feedback of the terminal from the disabled state to the enabled state. The processing module 502 is configured to generate second signaling when the RTT is greater than a second threshold, and the second signaling is used to switch the HARQ feedback of the terminal from the enabled state to the disabled state. The second threshold is greater than or equal to the first threshold.

Optionally, the processing module 502 is configured to generate third signaling when the RTT is less than a third threshold, and the third signaling is used to switch HARQ feedbacks of a first target number of HARQ processes among at least one HARQ process supported by the terminal from the disabled state to the enabled state. The processing module 502 is configured to generate fourth signaling when the RTT is greater than a fourth threshold, and the fourth signaling is used to switch HARQ feedbacks of a second target number of HARQ processes among the at least one HARQ process supported by the terminal from the enabled state to the disabled state. The fourth threshold is greater than or equal to the third threshold.

Optionally, the third signaling is used to indicate a process number of each HARQ process among the first target number of HARQ processes; and the fourth signaling is used to indicate a process number of each HARQ process among the second target number of HARQ processes.

Optionally, the processing module 502 is configured to generate fifth signaling when the RTT is less than a fifth threshold, and the fifth signaling is used to switch HARQ feedbacks of a third target number of service types among at least one service type received by the terminal from the disabled state to the enabled state. The processing module 502 is configured to generate sixth signaling when the RTT is greater than a sixth threshold, and the sixth signaling is used to switch HARQ feedbacks of a fourth target number of service types among the at least one service type received by the terminal from the enabled state to the disabled state. The sixth threshold is greater than or equal to the fifth threshold.

Optionally, the apparatus is a satellite, and a communication range on ground of the satellite covers a cell.

Optionally, the processing module 502 is configured to determine a minimum RTT of the wireless signal, and the minimum RTT is a RTT of the wireless signal between the satellite and a target position, wherein the target position is a position on ground which is closest to the satellite in the cell, and the minimum RTT is used to set HARQ feedbacks of all the terminals in the cell to be in the enabled state or the disabled state. The processing module 502 is configured to generate the target signaling according to the minimum RTT.

Optionally, the processing module 502 is configured to generate seventh signaling when the minimum RTT is less than a seventh threshold, and the seventh signaling is used to switch the HARQ feedbacks of all the terminals in the cell from the disabled state to the enabled state. The processing module 502 is configured to generate eighth signaling when the minimum RTT is larger than an eighth threshold, and the eighth signaling is used to switch the HARQ feedbacks of all the terminals in the cell from the enabled state to the disabled state. The eighth threshold is greater than or equal to the seventh threshold.

Figure 20:
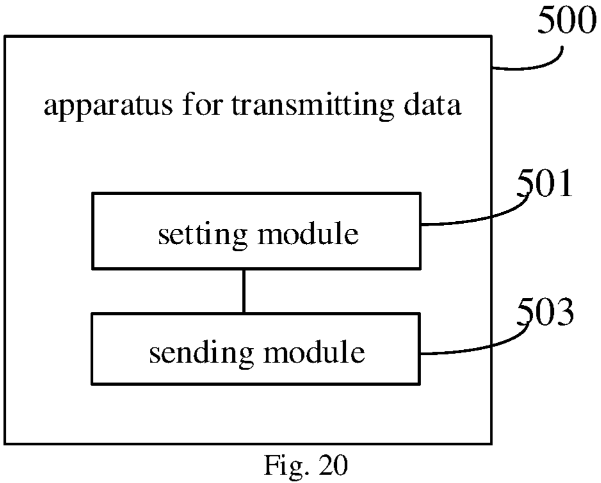
FIG. 20 is a block diagram of another apparatus for transmitting data provided by an embodiment of the present disclosure.

Optionally, the RTT is determined by the terminal. FIG. 20 shows a block diagram of an apparatus 500 for transmitting data provided by an embodiment of the present disclosure. The apparatus further includes: a sending module 503, configured to send ninth signaling, and the ninth signaling is used to indicate a ninth threshold. Alternatively, the sending module 503 is configured to send tenth signaling, and the tenth signaling is used to indicate a tenth threshold. The tenth threshold is greater than or equal to the ninth threshold. The ninth threshold is used to trigger the terminal to switch the HARQ feedback of the terminal from the disabled state to the enabled state when the RTT is less than the ninth threshold. The tenth threshold is used to trigger the terminal to switch the HARQ feedback of the terminal from the enabled state to the disabled when the RTT is greater than the tenth threshold.

Optionally, the HARQ feedback of the apparatus is in the disabled state. The sending module 503 is configured to send first wireless signal based on a target downlink HARQ process, and the target downlink HARQ process is at least one downlink HARQ process of the network side device. The sending module 503 is configured to perform no reception of the ACK or NACK for the target downlink HARQ process, and continue to send a second wireless signal based on the target downlink HARQ process after sending the first wireless signal.

Figure 21:
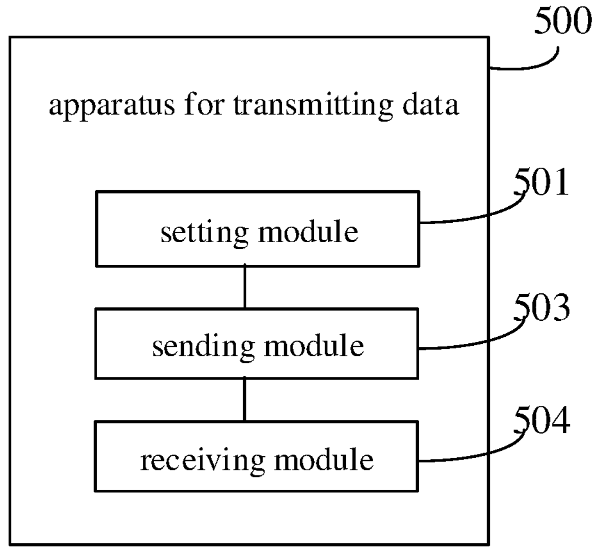
FIG. 21 is a block diagram of another apparatus for transmitting data provided by an embodiment of the present disclosure.

Optionally, the HARQ feedback of the apparatus is in the disabled state. FIG. 21 shows a block diagram of an apparatus 500 for transmitting data provided by an embodiment of the present disclosure. The apparatus further includes: a receiving module 504. The sending module 503 is configured to send first DCI. The first DCI is used to schedule a target uplink HARQ process. The target uplink HARQ process is at least one uplink HARQ process of the network side device. The receiving module 504 is configured to receive a first wireless signal based on the target uplink HARQ process. The sending module 503 is configured to send second DCI without considering a decoding result of the first wireless signal. The second DCI is used to schedule the target uplink HARQ process. The receiving module 504 is configured to receive a second wireless signal based on the target uplink HARQ process.

Optionally, the first signaling or the second signaling is RRC signaling, a MAC CE, or DCI. Alternatively, the third signaling or the fourth signaling is the RRC signaling, the MAC CE, or the DCI. Alternatively, the fifth signaling or the sixth signaling is the RRC signaling, the MAC CE, or the DCI. Alternatively, the seventh signaling or the eighth signaling is a system broadcast message. Alternatively, the ninth signaling or the tenth signaling is the RRC signaling, the MAC CE, or the DCI.

In summary, in the apparatus for transmitting data provided by an embodiment of the present disclosure, the target signaling can be sent to the terminal according to the RTT of the wireless signal, and the target signaling can be used to flexibly set the HARQ feedback function in the HARQ mechanism of the terminal. Since the HARQ feedback of the terminal can be selectively turned on or off according to the RRT of the wireless signal, unnecessary burdens on the terminal are avoided.

When the HARQ feedback of the terminal is in an off state (that is, the disabled state), a transmission delay of the wireless signal can be reduced. Moreover, in the method for transmitting data provided by an embodiment of the present disclosure, when the RTT of the wireless signal transmitted between the terminal and the network side device is large, the HARQ feedback of the terminal is set to be in the disabled state. Thereby, faster retransmission is achieved, and the reliability of data transmission is ensured in addition to ensuring the delay of data transmission. When the RTT of the wireless signal transmitted between the terminal and the network side device is small, the HARQ feedback of the terminal is set to be in the enabled state, so that the network side device can determine to retransmit data or transmit new data according to whether the wireless signal is correctly decoded, ensuring the reliability of data transmission. Moreover, since the state of the HARQ feedback is flexibly set based on the RTT, the system resource can be used more effectively, reducing unnecessary resource waste.

In addition, when the terminal is in the disabled state, in the process of downlink transmission, for a target downlink HARQ process, the network side device can continue to use the same target downlink HARQ process for downlink data transmission, without waiting for the ACK or NACK with respect to a certain wireless signal fed back by the terminal. Accordingly, the terminal uses the downlink HARQ process for downlink transmission without the need for waiting for the network side device having received the ACK or NACK fed back for the target downlink HARQ process by the terminal. Since there is provided the disenabled state for the HARQ feedback, which effectively reduces the transmission delay compared to the enabled state, the pressure on the terminal is effectively reduced, and the signal transmission delay is reduced. In the process of uplink transmission, for a target uplink HARQ process, since the network side device does not need to wait for the first wireless signal as received before it sends the DCI for scheduling the target uplink HARQ process to the terminal, it can directly schedule the same target uplink HARQ process for transmission of the second wireless signal after the transmission of the first wireless signal is scheduled. Accordingly, after the terminal sends the first wireless signal, it can continue to send the second wireless signal, without waiting for receiving a completion indication about decoding of the first wireless signal from the network side device. Since there is provided the disenabled state for the HARQ feedback, which effectively reduces the transmission delay compared to the enabled state, the pressure on the terminal is effectively reduced, and the signal transmission delay between the terminal and the network side device is reduced.

An embodiment of the present disclosure provides a data transmission system, which system includes a terminal and a network side device. The terminal is the apparatus for transmitting data in FIGS. 14 and 15, and the network side device is the apparatus for transmitting data in FIGS. 17 to 21.

Figure 22:
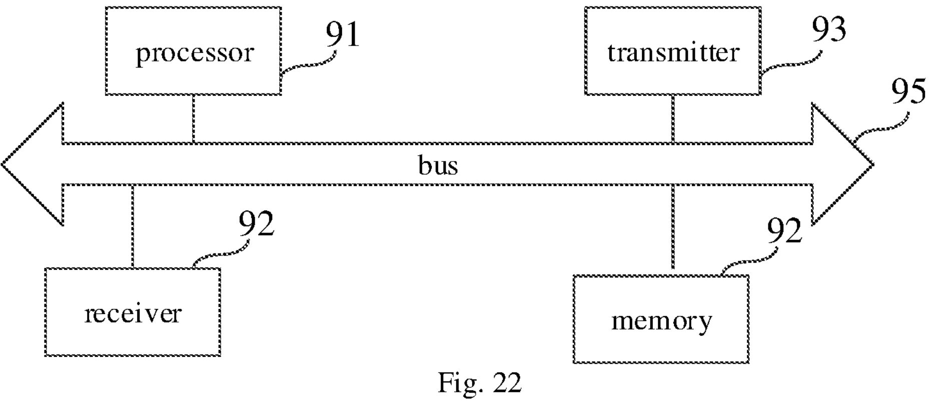
FIG. 22 is a structural block diagram of a terminal provided by an embodiment of the present disclosure.

Reference is made to FIG. 22, which shows a structural block diagram of a terminal provided by an exemplary embodiment of the present disclosure. The terminal includes: a processor 91, a receiver 92, a transmitter 93, a memory 94, and a bus 95.

The processor 91 includes one or more processing cores. The processor 91 executes various functional applications and information processing by running software programs and modules.

The receiver 92 and the transmitter 93 may be implemented as one communication component, which communication component may be a communication chip. The communication chip may include a receiving module, a transmission module, a modem module and the like, and is configured to modulate and/or demodulate information and receive or send the information through a wireless signal.

The memory 94 is connected to the processor 91 through the bus 95.

The memory 94 may be configured to store at least one instruction. The processor 91 is configured to execute the at least one instruction, so as to implement each step in the foregoing method embodiments.

In addition, the memory 94 can be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The present disclosure provides a computer-readable storage medium in which at least one instruction is stored. The at least one instruction is loaded and executed by the processor to implement the method for transmitting data provided by the foregoing various method embodiments.

The present disclosure also provides a chip, including a programmable logic circuit and/or program instructions, wherein the chip, when running, is configured to implement the method for transmitting data provided by the foregoing various method embodiments.

The present disclosure also provides a computer program product including one or more computer programs which, when executed by a processor, is configured to implement the method for transmitting data provided by the foregoing various method embodiments.

Figure 23:
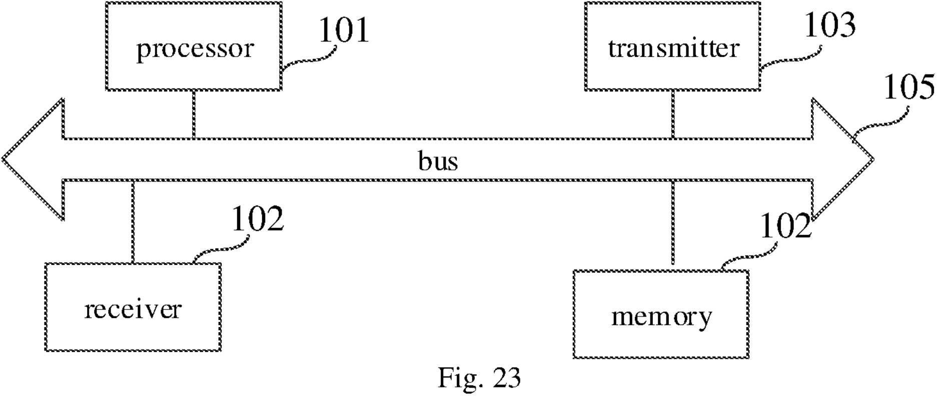
FIG. 23 is a structural block diagram of a network side device provided by an embodiment of the present disclosure.

Reference is made to FIG. 23, which shows a structural block diagram of a network side device provided by an exemplary embodiment of the present disclosure. The network side device includes: a processor 101, a receiver 102, a transmitter 103, a memory 104, and a bus 105.

The processor 101 includes one or more processing cores. The processor 101 executes various functional applications and information processing by running software programs and modules.

The receiver 102 and the transmitter 103 may be implemented as one communication component, which communication component may be a communication chip. The communication chip may include a receiving module, a transmission module, a modem module and the like, and is configured to modulate and/or demodulate information and receive or send the information through a wireless signal.

The memory 104 is connected to the processor 101 through the bus 105.

The memory 104 may be configured to store at least one instruction. The processor 101 is configured to execute the at least one instruction, so as to implement each step in the foregoing method embodiments.

In addition, the memory 104 can be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The present disclosure provides a computer-readable storage medium in which at least one instruction is stored. The at least one instruction is loaded and executed by the processor to implement the method for transmitting data provided by the foregoing various method embodiments.

The present disclosure also provides a chip, including a programmable logic circuit and/or program instructions, wherein the chip, when running, is configured to implement the method for transmitting data provided by the foregoing various method embodiments.

The present disclosure also provides a computer program product including one or more computer programs which, when executed by a processor, is configured to implement the method for transmitting data provided by the foregoing various method embodiments.

Those of ordinary skill in the art should understand that all or part of the steps in the foregoing embodiments may be completed through hardware, or may also be completed through the hardware instructed by a program. The program may be stored in a computer-readable storage medium, and the storage medium may be a read-only memory, a magnetic disk, an optical disk or the like.

The above descriptions are only preferred embodiments of the present disclosure and are not intended to limit the present disclosure. Any modification, equivalent replacement, improvement and the like within the spirit and principle of the present disclosure shall be included in the protection scope of the present disclosure.

What is claimed is:

1. A method for transmitting data, applied to a terminal, and comprising:

setting a hybrid automatic repeat request HARQ feedback of the terminal to be in an enabled state or a disabled state according to a round trip time RTT of a wireless signal, wherein the enabled state is a state in which an acknowledgement ACK or a negative acknowledgement NACK is fed back, and the disabled state is a state in which neither the ACK nor the NACK is fed back, wherein the setting the HARQ feedback of the terminal to be in the enabled state or the disabled state according to the RTT of the wireless signal comprises:

receiving target signaling, wherein the target signaling is generated by the network side device according to the RTT of the wireless signal, and setting the HARQ feedback of the terminal to be in the enabled state or the disabled state according to the target signaling;

wherein the target signaling is used to instruct to set HARQ feedback of each HARQ process among all of a plurality of HARQ processes used by each service type received by the terminal to be in the enabled state or the disabled state; and wherein receiving the target signaling comprises:

receiving first signaling, wherein the first signaling is used to instruct to switch the HARQ feedback of the terminal from the disabled state to the enabled state; and receiving second signaling, wherein the second signaling is used to instruct to switch the HARQ feedback of the terminal from the enabled state to the disabled state, wherein the first signaling and the second signaling are both generated by the network side device according to the RTT.

2. The method according to claim 1, wherein the RTT is determined by a network side device; or the RTT is determined by the terminal.

3. The method according to claim 2, wherein the receiving the target signaling comprises receiving ninth signaling, wherein the ninth signaling is used to indicate a ninth threshold; and the setting the HARQ feedback of the terminal to be in the enabled state or the disabled state according to the RTT of the wireless signal comprises: determining the RTT of the wireless signal; and switching the HARQ feedback of the terminal from the disabled state to the enabled state in response that the RTT is less than the ninth threshold; or the receiving the target signaling comprises receiving tenth signaling, wherein the tenth signaling is used to indicate a tenth threshold; and the setting the HARQ feedback of the terminal to be in the enabled state or the disabled state according to the RTT of the wireless signal comprises: determining the RTT of the wireless signal; and switching the HARQ feedback of the terminal from the enabled state to the disabled state in response that the RTT is greater than the tenth threshold, wherein the tenth threshold is greater than or equal to the ninth threshold.

4. The method according to claim 1, wherein the network side device is a satellite, and a communication range on ground of the satellite covers a cell.

5. The method according to claim 1, wherein the HARQ feedback of the terminal is in the disabled state, and the method further comprises:

receiving first downlink control information DCI, wherein the first DCI is used to schedule a target uplink HARQ process, and the target uplink HARQ process is at least one uplink HARQ process of the terminal;

sending a first wireless signal based on the target uplink HARQ process;

receiving second DCI, wherein the second DCI is sent by the network side device without considering a decoding result of the first wireless signal, and the second DCI is used to schedule the target uplink HARQ process; and sending a second wireless signal based on the target uplink HARQ process.

6. The method according to claim 1, wherein the first signaling or the second signaling is radio resource control RRC signaling, a medium access control MAC control unit CE, or downlink control information DCI; or the third signaling or the fourth signaling is the RRC signaling, the MAC CE, or the DCI; or the fifth signaling or the sixth signaling is the RRC signaling, the MAC CE, or the DCI; or the seventh signaling or the eighth signaling is a system broadcast message; or the ninth signaling or the tenth signaling is the RRC signaling, the MAC CE, or the DCI.

7. The method according to claim 1, wherein the HARQ feedback of the terminal is in the disabled state, and the method further comprises:

receiving a first wireless signal based on a target downlink HARQ process, wherein the target downlink HARQ process is at least one downlink HARQ process of the terminal; and performing no feedback of the ACK or the NACK for the target downlink HARQ process, and continuing to receive a second wireless signal based on the target downlink HARQ process after receiving the first wireless signal.

8. A method for transmitting data, applied to a network side device, and comprising:

setting a HARQ feedback of the network side device to be in an enabled state or a disabled state according to a RTT of a wireless signal, wherein the enabled state is a state in which an ACK or a NACK fed back by a terminal is received, and the disabled state is a state in which neither the ACK nor the NACK is fed back by the terminal, wherein the method further comprises:

generating and sending target signaling according to the RTT;

wherein the target signaling is used to set the HARQ feedback of the terminal to be in the enabled state or the disabled state;

wherein the target signaling is used to instruct to set HARQ feedback of each HARQ process among all of a plurality of HARQ processes used by each service type received by the terminal to be in the enabled state or the disabled state; and wherein sending the target signaling comprises:

sending first signaling, wherein the first signaling is used to instruct to switch the HARQ feedback of the terminal from the disabled state to the enabled state; and sending second signaling, wherein the second signaling is used to instruct to switch the HARQ feedback of the terminal from the enabled state to the disabled state, wherein the first signaling and the second signaling are both generated by the network side device according to the RTT.

9. The method according to claim 8, wherein the RTT is determined by the network side device; or the RTT is determined by the terminal.

10. The method according to claim 9, wherein the setting the HARQ feedback of the network side device to be in the enabled state or the disabled state according to the RTT of the wireless signal comprises:

determining the RTT of the wireless signal; and setting the HARQ feedback of the network side device to be in the enabled state or the disabled state according to the RTT.

11. The method according to claim 10, wherein the RTT is determined by the terminal; and the method also comprises:

sending ninth signaling, wherein the ninth signaling is used to indicate a ninth threshold, or sending tenth signaling, wherein the tenth signaling is used to indicate a tenth threshold, wherein the tenth threshold is greater than or equal to the ninth threshold, the ninth threshold is used to trigger the terminal to switch the HARQ feedback of the terminal from the disabled state to the enabled state in response that the RTT is less than the ninth threshold, and the tenth threshold is used to trigger the terminal to switch the HARQ feedback of the terminal from the enabled state to the disabled in response that the RTT is greater than the tenth threshold.

12. The method according to claim 9, wherein the method further comprises:

sending first DCI, wherein the first DCI is used to schedule a target uplink HARQ process, and the target uplink HARQ process is at least one uplink HARQ process of the network side device;

receiving a first wireless signal based on the target uplink HARQ process;

sending second DCI without considering a decoding result of the first wireless signal, wherein the second DCI is used to schedule the target uplink HARQ process; and receiving a second wireless signal based on the target uplink HARQ process.

13. The method according to claim 8, wherein the HARQ feedback of the network side device is in the disabled state, and the method further comprises:

sending a first wireless signal based on a target downlink HARQ process, wherein the target downlink HARQ process is at least one downlink HARQ process of the network side device; and performing no reception of the ACK or the NACK for the target downlink HARQ process, and continuing to send a second wireless signal based on the target downlink HARQ process after sending the first wireless signal.

14. A network side device, comprising a processor and a memory, wherein the memory stores at least one instruction, and the at least one instruction is configured to be executed by the processor to implement the method for transmitting data according to claim 8.

15. A terminal, comprising a processor and a memory, wherein the memory stores at least one instruction, and the at least one instruction is configured to be executed by the processor to implement a method for transmitting data comprising:

setting a hybrid automatic repeat request HARQ feedback of the terminal to be in an enabled state or a disabled state according to a round trip time RTT of a wireless signal, wherein the enabled state is a state in which an acknowledgement ACK or a negative acknowledgement NACK is fed back, and the disabled state is a state in which neither the ACK nor the NACK is fed back, wherein the setting the HARQ feedback of the terminal to be in the enabled state or the disabled state according to the RTT of the wireless signal comprises:

receiving target signaling, wherein the target signaling is generated by the network side device according to the RTT of the wireless signal, and setting the HARQ feedback of the terminal to be in the enabled state or the disabled state according to the target signaling;

wherein the target signaling is used to instruct to set HARQ feedback of each HARQ process among all of a plurality of HARQ processes used by each service type received by the terminal to be in the enabled state or the disabled state; and wherein receiving the target signaling comprises:

receiving first signaling, wherein the first signaling is used to instruct to switch the HARQ feedback of the terminal from the disabled state to the enabled state; and receiving second signaling, wherein the second signaling is used to instruct to switch the HARQ feedback of the terminal from the enabled state to the disabled state, wherein the first signaling and the second signaling are both generated by the network side device according to the RTT.

* * * * *